US008538323B2

(12) United States Patent
Dankberg et al.

(10) Patent No.: US 8,538,323 B2
(45) Date of Patent: Sep. 17, 2013

(54) SATELLITE ARCHITECTURE

(75) Inventors: Mark D. Dankberg, Encinitas, CA (US); Mark J. Miller, Vista, CA (US); Steven R. Hart, Carlsbad, CA (US); Kristi Jaska, Encinitas, CA (US); Robert Wilson, East Charleston, VT (US)

(73) Assignee: ViaSat, Inc., Carlsbad, CA (US)

( * ) Notice: Subject to any disclaimer, the term of this patent is extended or adjusted under 35 U.S.C. 154(b) by 348 days.

(21) Appl. No.: 12/406,880

(22) Filed: Mar. 18, 2009

(65) Prior Publication Data

US 2009/0298416 A1 Dec. 3, 2009
US 2012/0276840 A9 Nov. 1, 2012

Related U.S. Application Data

(63) Continuation of application No. PCT/US2007/079567, filed on Sep. 26, 2007.

(60) Provisional application No. 60/827,959, filed on Oct. 3, 2006, provisional application No. 60/827,924, filed on Oct. 3, 2006, provisional application No. 60/827,927, filed on Oct. 3, 2006, provisional application No. 60/827,960, filed on Oct. 3, 2006, provisional application No. 60/827,964, filed on Oct. 3, 2006, provisional application No. 60/827,038, filed on Sep. 26, 2006.

(51) Int. Cl.
*H04H 20/74* (2008.01)

(52) U.S. Cl.
USPC .............. 455/3.02; 370/316; 333/1; 333/137; 343/850; 343/865; 340/1.1; 340/16.1

(58) Field of Classification Search
USPC ....................................................... 455/3.02
See application file for complete search history.

(56) References Cited

U.S. PATENT DOCUMENTS 4,689,625 A * 8/1987 Barmat ......................... 342/356
4,813,036 A * 3/1989 Whitehead .................... 370/325

(Continued)

FOREIGN PATENT DOCUMENTS

EP   1 033 822       9/2000
WO   02/09318 A2    1/2002

(Continued)

OTHER PUBLICATIONS

Acampora, A.S., "The Ultimate Capacity of Frequency-Reuse Communication Satellites", Bell System Technical Journal, vol. 59, No. 7, Sep. 1980, pp. 1089-1122.

(Continued)

*Primary Examiner* — Hai V Nguyen
(74) *Attorney, Agent, or Firm* — Kilpatrick Townsend & Stockton LLP

(57) ABSTRACT

A method is presented for transmitting data in a satellite system having multiple spot beams comprising (1) sending a broadband signal in a forward direction from a gateway terminal to a communications satellite for relay to at least one subscriber terminal, (2) receiving the broadband signal at the communications satellite, wherein the communications satellite comprises a bent pipe repeater having a plurality of satellite-based transmission amplifiers, (3) using one of the plurality of satellite-based transmission amplifiers to amplify the broadband signal and no other broadband signal from the gateway terminal, to produce an amplified broadband signal, (4) sending the amplified broadband signal as one of a plurality of service spot beams to the at least one subscriber terminal, and (5) receiving and retrieving data from the amplified broadband signal at the at least one subscriber terminal.

25 Claims, 18 Drawing Sheets

(56) References Cited

U.S. PATENT DOCUMENTS

| | | | |
|---|---|---|---|
| 4,831,619 A * | 5/1989 | Rosen | 370/325 |
| 4,879,711 A * | 11/1989 | Rosen | 370/325 |
| 4,931,802 A * | 6/1990 | Assal et al. | 342/356 |
| 5,295,138 A * | 3/1994 | Greenberg et al. | 370/344 |
| 5,408,237 A | 4/1995 | Patterson et al. | |
| 5,408,680 A | 4/1995 | Hattey et al. | |
| 5,448,621 A | 9/1995 | Knudsen | |
| 5,473,601 A | 12/1995 | Rosen et al. | |
| 5,513,210 A | 4/1996 | Vook et al. | |
| 5,574,968 A | 11/1996 | Olds et al. | |
| 5,574,969 A | 11/1996 | Olds et al. | |
| 5,608,722 A | 3/1997 | Miller | |
| 5,610,556 A * | 3/1997 | Rubin | 330/124 D |
| 5,613,194 A | 3/1997 | Olds et al. | |
| 5,619,525 A * | 4/1997 | Wiedeman et al. | 375/130 |
| 5,640,386 A | 6/1997 | Wiedeman | |
| 5,664,006 A | 9/1997 | Monte et al. | 455/405 |
| 5,697,050 A * | 12/1997 | Wiedeman | 455/12.1 |
| 5,717,686 A * | 2/1998 | Schiavoni | 370/321 |
| 5,737,684 A * | 4/1998 | Goto | 455/12.1 |
| 5,758,260 A * | 5/1998 | Wiedeman | 455/12.1 |
| 5,805,579 A | 9/1998 | Erving et al. | |
| 5,825,325 A * | 10/1998 | O'Donovan et al. | 342/353 |
| 5,826,190 A | 10/1998 | Krutz et al. | |
| 5,838,670 A * | 11/1998 | Billstrom | 370/328 |
| 5,884,181 A | 3/1999 | Arnold | |
| 5,943,324 A * | 8/1999 | Ramesh et al. | 370/321 |
| 5,943,608 A | 8/1999 | Sherman | |
| 5,966,371 A * | 10/1999 | Sherman | 370/320 |
| 5,978,653 A | 11/1999 | Taylor et al. | |
| 6,032,041 A * | 2/2000 | Wainfan et al. | 455/427 |
| 6,043,776 A * | 3/2000 | Chiba et al. | 342/354 |
| 6,085,067 A | 7/2000 | Gallagher | |
| 6,141,534 A | 10/2000 | Snell et al. | |
| 6,243,580 B1 * | 6/2001 | Garner | 455/428 |
| 6,282,179 B1 * | 8/2001 | Sherman | 370/320 |
| 6,295,440 B2 | 9/2001 | Chang | |
| 6,314,269 B1 | 11/2001 | Hart et al. | |
| 6,317,583 B1 | 11/2001 | Wolcott et al. | |
| 6,324,181 B1 | 11/2001 | Wong et al. | |
| 6,339,707 B1 * | 1/2002 | Wainfan et al. | 455/427 |
| 6,343,210 B1 | 1/2002 | Emmons, Jr. | |
| 6,366,761 B1 | 4/2002 | Montpetit | |
| 6,374,104 B1 * | 4/2002 | Croq et al. | 455/427 |
| 6,377,561 B1 * | 4/2002 | Black et al. | 370/330 |
| 6,397,039 B1 * | 5/2002 | Butte et al. | 455/12.1 |
| 6,449,267 B1 | 9/2002 | Connors | |
| 6,456,846 B2 * | 9/2002 | Norin et al. | 455/429 |
| 6,463,279 B1 | 10/2002 | Sherman | |
| 6,463,281 B1 * | 10/2002 | Norin et al. | 455/429 |
| 6,466,569 B1 * | 10/2002 | Wright et al. | 370/347 |
| 6,511,020 B2 * | 1/2003 | Higgins | 455/12.1 |
| 6,512,749 B1 | 1/2003 | Wright et al. | |
| 6,522,864 B1 * | 2/2003 | Febvre et al. | 455/12.1 |
| 6,542,739 B1 * | 4/2003 | Garner | 455/427 |
| 6,567,645 B1 | 5/2003 | Wiedeman | |
| 6,628,921 B1 | 9/2003 | Vaddiparty | |
| 6,694,137 B2 | 2/2004 | Sharon | |
| 6,704,543 B1 * | 3/2004 | Sharon et al. | 455/12.1 |
| 6,708,029 B2 * | 3/2004 | Wesel | 455/428 |
| 6,725,013 B1 | 4/2004 | Chang et al. | |
| 6,744,743 B2 | 6/2004 | Walton et al. | |
| 6,751,458 B1 | 6/2004 | Wang et al. | |
| 6,788,917 B1 * | 9/2004 | Refai et al. | 455/12.1 |
| 6,801,789 B1 | 10/2004 | Kato | |
| 6,816,500 B1 | 11/2004 | Mannette et al. | |
| 6,823,170 B1 * | 11/2004 | Dent | 455/13.3 |
| 6,831,921 B2 * | 12/2004 | Higgins | 370/401 |
| 6,850,732 B2 * | 2/2005 | Patterson et al. | 455/12.1 |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,931,245 B2 | 8/2005 | Fikart | |
| 6,937,857 B2 * | 8/2005 | Karabinis | 455/428 |
| 6,941,138 B1 | 9/2005 | Chang | |
| 6,944,450 B2 * | 9/2005 | Cox | 455/431 |
| 6,963,548 B1 | 11/2005 | Chang | |
| 6,975,600 B1 | 12/2005 | Vaughan | |
| 6,975,601 B2 | 12/2005 | Connors | |
| 6,977,912 B1 | 12/2005 | Porter et al. | |
| 6,987,741 B2 | 1/2006 | Kelly et al. | |
| 6,993,288 B2 * | 1/2006 | de La Chapelle et al. | 455/12.1 |
| 6,999,720 B2 | 2/2006 | Karabinis | |
| 7,003,021 B2 | 2/2006 | Gilhousen | |
| 7,006,530 B2 | 2/2006 | Spinar et al. | |
| 7,016,646 B2 | 3/2006 | Mayfield et al. | |
| 7,031,653 B1 * | 4/2006 | Turley et al. | 455/3.02 |
| 7,039,715 B2 | 5/2006 | England et al. | |
| 7,062,267 B2 | 6/2006 | Karabinis | |
| 7,065,355 B2 | 6/2006 | Spio | |
| 7,068,975 B2 * | 6/2006 | Loner | 455/12.1 |
| 7,069,036 B2 | 6/2006 | Jarett | |
| 7,092,727 B1 | 8/2006 | Li et al. | |
| 7,142,809 B1 * | 11/2006 | Godwin | 455/3.02 |
| 7,149,526 B2 | 12/2006 | Karabinis et al. | |
| 7,177,592 B2 | 2/2007 | Jarett | |
| 7,180,873 B1 * | 2/2007 | Monte et al. | 370/325 |
| 7,181,162 B2 | 2/2007 | Chang et al. | |
| 7,200,360 B1 | 4/2007 | Chang et al. | |
| 7,215,954 B1 | 5/2007 | Yung et al. | |
| 7,218,931 B2 | 5/2007 | Karabinis | |
| 7,233,620 B2 | 6/2007 | Brommer | |
| 7,248,841 B2 * | 7/2007 | Agee et al. | 455/101 |
| 7,305,211 B2 * | 12/2007 | Dent | 455/12.1 |
| 7,308,230 B2 * | 12/2007 | Godwin | 455/3.02 |
| 7,340,213 B2 | 3/2008 | Karabinis et al. | |
| 7,356,343 B2 | 4/2008 | Feher | |
| 7,376,417 B2 | 5/2008 | Walsh et al. | |
| 7,376,418 B2 | 5/2008 | Wells | |
| 7,382,743 B1 | 6/2008 | Rao et al. | |
| 7,450,949 B2 | 11/2008 | Choksi | |
| 7,505,736 B2 * | 3/2009 | Min | 455/12.1 |
| 7,564,420 B2 | 7/2009 | Jeon et al. | 343/757 |
| 7,574,206 B2 * | 8/2009 | Karabinis | 455/428 |
| 7,577,400 B2 | 8/2009 | Karabinis et al. | |
| 7,606,590 B2 * | 10/2009 | Karabinis | 455/522 |
| 7,609,666 B2 * | 10/2009 | Karabinis | 370/316 |
| 7,627,285 B2 | 12/2009 | Karabinis | |
| 7,643,827 B1 * | 1/2010 | Kiesling | 455/427 |
| 7,650,379 B2 * | 1/2010 | Hart et al. | 709/203 |
| 7,653,348 B2 * | 1/2010 | Karabinis | 455/12.1 |
| 7,706,746 B2 | 4/2010 | Karabinis | |
| 7,706,748 B2 * | 4/2010 | Dutta | 455/13.3 |
| 7,706,787 B2 * | 4/2010 | Malarky et al. | 455/429 |
| 7,773,942 B2 * | 8/2010 | Hudson et al. | 455/12.1 |
| 7,792,070 B1 * | 9/2010 | Burr | 370/316 |
| 7,792,488 B2 | 9/2010 | Karabinis et al. | |
| 7,831,251 B2 | 11/2010 | Karabinis et al. | |
| 7,869,759 B2 * | 1/2011 | Pateros et al. | 455/12.1 |
| 7,890,050 B2 | 2/2011 | Karabinis | |
| 7,907,893 B2 | 3/2011 | Karabinis | |
| 7,975,008 B2 * | 7/2011 | Hart et al. | 709/203 |
| 7,979,024 B2 | 7/2011 | Zheng | |
| 7,995,515 B2 * | 8/2011 | Thesling | 370/322 |
| 8,010,043 B2 * | 8/2011 | Miller | 455/12.1 |
| 8,023,954 B2 * | 9/2011 | Karabinis | 455/447 |
| 8,031,646 B2 * | 10/2011 | Karabinis | 370/310 |
| 8,045,975 B2 * | 10/2011 | Karabinis | 455/427 |
| 8,050,674 B2 * | 11/2011 | Karabinis | 455/427 |
| 8,055,257 B2 * | 11/2011 | Karabinis | 455/427 |
| 8,107,368 B2 * | 1/2012 | Connors et al. | 370/230 |
| 8,107,410 B2 * | 1/2012 | Connors et al. | 370/316 |
| 8,107,875 B2 * | 1/2012 | Miller | 455/3.02 |
| 2002/0013149 A1 | 1/2002 | Threadgill et al. | |
| 2002/0032003 A1 * | 3/2002 | Avitzour et al. | 455/12.1 |
| 2002/0077099 A1 * | 6/2002 | LaPrade | 455/430 |
| 2002/0105976 A1 | 8/2002 | Kelly et al. | |
| 2002/0122408 A1 * | 9/2002 | Mullins | 370/347 |
| 2002/0187747 A1 | 12/2002 | Sawdey et al. | |
| 2003/0016649 A1 | 1/2003 | Connors | |
| 2003/0022625 A1 * | 1/2003 | Otten et al. | 455/13.1 |
| 2003/0050008 A1 | 3/2003 | Patterson et al. | |
| 2003/0054814 A1 | 3/2003 | Karabinis et al. | |
| 2003/0073436 A1 | 4/2003 | Karabinis et al. | |

| | | | |
|---|---|---|---|
| 2003/0134594 A1* | 7/2003 | Lane et al. | 455/12.1 |
| 2003/0143995 A1 | 7/2003 | Friedman | |
| 2003/0149986 A1* | 8/2003 | Mayfield et al. | 725/63 |
| 2004/0014472 A1* | 1/2004 | de La Chapelle et al. | 455/429 |
| 2004/0023658 A1* | 2/2004 | Karabinis et al. | 455/447 |
| 2004/0058646 A1 | 3/2004 | Courtney et al. | |
| 2004/0072561 A1 | 4/2004 | LaPrade | |
| 2004/0097192 A1 | 5/2004 | Schiff | |
| 2004/0102156 A1 | 5/2004 | Loner | |
| 2004/0166801 A1* | 8/2004 | Sharon et al. | 455/12.1 |
| 2004/0185775 A1 | 9/2004 | Bell et al. | |
| 2005/0058229 A1 | 3/2005 | Alagha | |
| 2005/0085186 A1* | 4/2005 | Sandrin | 455/12.1 |
| 2005/0108374 A1* | 5/2005 | Pierzga et al. | 709/223 |
| 2005/0118947 A1* | 6/2005 | Ames et al. | 455/12.1 |
| 2005/0164701 A1* | 7/2005 | Karabinis et al. | 455/428 |
| 2005/0181786 A1 | 8/2005 | Karabinis et al. | |
| 2005/0186980 A1 | 8/2005 | Richharia et al. | |
| 2005/0197060 A1* | 9/2005 | Hedinger et al. | 455/12.1 |
| 2005/0227618 A1 | 10/2005 | Karabinis | |
| 2005/0260947 A1* | 11/2005 | Karabinis et al. | 455/12.1 |
| 2005/0272369 A1 | 12/2005 | Karabinis et al. | |
| 2005/0282542 A1 | 12/2005 | Karabinis | |
| 2005/0288011 A1* | 12/2005 | Dutta | 455/427 |
| 2006/0040612 A1* | 2/2006 | Min | 455/12.1 |
| 2006/0056330 A1 | 3/2006 | Anderson et al. | |
| 2006/0105707 A1* | 5/2006 | Karabinis | 455/12.1 |
| 2006/0135060 A1 | 6/2006 | Karabinis | |
| 2006/0181455 A1* | 8/2006 | Hudson et al. | 342/359 |
| 2006/0189274 A1 | 8/2006 | Karbabinis | |
| 2006/0205347 A1* | 9/2006 | Karabinis | 455/12.1 |
| 2006/0211419 A1 | 9/2006 | Karabinis | |
| 2006/0252368 A1 | 11/2006 | Karabinis | |
| 2006/0256839 A1 | 11/2006 | Tsai et al. | |
| 2006/0276129 A1 | 12/2006 | Karabinis | |
| 2007/0026867 A1* | 2/2007 | Karabinis | 455/447 |
| 2007/0037514 A1* | 2/2007 | Karabinis | 455/13.3 |
| 2007/0082609 A1* | 4/2007 | Kiesling | 455/12.1 |
| 2007/0232298 A1 | 10/2007 | Karabinis | |
| 2007/0281612 A1* | 12/2007 | Benjamin et al. | 455/13.3 |
| 2008/0146145 A1* | 6/2008 | Pateros et al. | 455/12.1 |
| 2008/0298439 A1 | 12/2008 | Courseille et al. | |
| 2009/0023384 A1* | 1/2009 | Miller | 455/12.1 |
| 2009/0081946 A1* | 3/2009 | Dankberg et al. | 455/3.02 |
| 2009/0137203 A1* | 5/2009 | Karabinis et al. | 455/12.1 |
| 2009/0170427 A1* | 7/2009 | Karabinis | 455/12.1 |
| 2009/0264120 A1* | 10/2009 | Karabinis | 455/427 |
| 2009/0285151 A1* | 11/2009 | Eidenschink et al. | 370/316 |
| 2009/0285152 A1* | 11/2009 | Eidenschink et al. | 370/316 |
| 2009/0286467 A1* | 11/2009 | Miller | 455/3.02 |
| 2009/0290530 A1* | 11/2009 | Dankberg et al. | 370/316 |
| 2009/0290531 A1* | 11/2009 | Connors et al. | 370/316 |
| 2009/0290532 A1* | 11/2009 | Connors et al. | 370/316 |
| 2009/0290533 A1* | 11/2009 | Connors et al. | 370/316 |
| 2009/0291633 A1* | 11/2009 | Dankberg et al. | 455/12.1 |
| 2009/0295628 A1* | 12/2009 | Wilson et al. | 342/356 |
| 2009/0298416 A1* | 12/2009 | Dankberg et al. | 455/3.02 |
| 2009/0298423 A1* | 12/2009 | Dankberg et al. | 455/12.1 |
| 2010/0255776 A1* | 10/2010 | Hudson et al. | 455/12.1 |
| 2011/0007686 A1* | 1/2011 | Burr | 370/316 |

FOREIGN PATENT DOCUMENTS

| | | |
|---|---|---|
| WO | 2004/010610 A1 | 1/2004 |
| WO | 2005/029729 A2 | 3/2005 |
| WO | 2006/012348 A2 | 2/2006 |
| WO | WO 2006/065584 A2 | 6/2006 |
| WO | 2006/099443 A1 | 9/2006 |
| WO | 2008/060760 A2 | 5/2008 |
| WO | WO 2008/108885 A2 | 9/2008 |
| WO | WO 2010/111041 A1 | 9/2010 |

OTHER PUBLICATIONS

Baker, A., et al., "Earth-to-Space Links for Broadcasting Satellites", Proceedings from International Conference on Satellite Communication Systems Technology, London, England, Apr. 7-10, 1975, pp. 13-20.

Chung, S., et al., "Analysis of Multiservice Cellular Networks with Asymmetrical Traffic and Handoff Queue", Computer Communications, 2005, vol. 28, pp. 864-879.

Davies, R., "Use of a Processing Satellite for Digital Data Transmission Between Low-Cost Earth Terminals", AIAA yth Communications Satellite Systems Conference, San Diego, Earth Terminals, AIAA yth Communications Satellite Systems Conference, San Diego, California, Apr. 24-27, 1978, pp. 666-772.

Kelkar, M et al., "Physics of an Arc in Cross-Flow", IEEE International Conference on Plasma Science, 2000, 5A05-5A06, p. 223.

Kim, T., et al., "Opportunistic Packet Scheduling Algorithm for Load Balancing in a Multi-Hop Relay-Enhanced Cellular OFOMA-TOD System", 2008, 14th Asia-Pacific Conference on Communications, Proceedings of APCC2008, 5 pages.

Kobayashi, Y., et al., "Asymmetrical Radio Resource Assignment Scheme for Connection-less Services in COMA/Shared-TOO Cellular Packet Communications", IEICE Transactions on Fundamentals of Electronics Communications and Computer Sciences, Jul. 2005, vol. E88-A, No. 7, pp. 1903-1911.

Kobayashi, Y., et al., "Radio Resource Assignment Scheme for Asymmetric Traffic in COMA/Shared-TOO Cellular Packet Communications", 2004, Proceedings of Vehicular Technology Conference, vol. 60, pp. 939-943.

Lee, Lin-Shan, Polarization Control Schemes for Satellite Communications with Multiple Uplinks: IEEE Transactions on Communications, Oct. 1979, vol. 27 Issue 10, pp. 1504-1512.

Lim, S., et al., "A Traffic Control Algorithm in Diverse Home Networks Through Priority Reassignment", The 8th International Conference on Communication Systems, ICCS 2002, vol. 1, pp. 160-163.

Lu, J., et al., "Polarization Insensitive All-Optical Up-Conversion for ROF Systems Based on Parallel Pump FWM in a SOA", Optics Express, Apr. 27, 2009, vol. 17, No. 9, pp. 6962-6967.

Maxwell, K., "Asymmetric Oigital Subscriber Line: Interim Technology for the Next Forty Years", IEEE Communications Magazine, Oct. 1996, vol. 34, No. 10, pp. 100-106.

Nrao, "Satellite Constellation Survey", Jul. 1998 [online], retrieved on Feb. 9, 2009. Retrieved from the internet <URL: http://www.vla.nrao.edu/astro/rfi/surveys/satellite/.

Rosen, E., "Bouncing Back to Broadband", Network World, Jun. 23, 2003, vol. 61, 7 pages.

Satellite Communications (Motor Carrier Safety Law Enforcement Options) Current as of: Jul. 12, 2001 [online], retrieved on Feb. 9, 2009. Retrieved from the internet <URL: http://fmcsa-ts.dot.gov/PublicDocument/research/SATELLITE%20COMMUNICATIONS.pdf.

Sellathurai et al., "Space-Time Coding in Mobile Satellite Communications Using Dual-Polarized Channels", IEEE Tr~nsactions on Vehicular Technology, Jan. 2006, vol. 55, Issue 1, pp. 188-199.

Sengul, E., et al., "A Spectrally Efficient PMR System Utilizing Broadcast Service", IEEE Transactions on Broadcasting, Dec. 2005, vol. 51, No. 4, pp. 493-503.

Spot Beam Technology, PMG Rev. Jun. 18, 2002, pp. 1-3 [online], retrieved on Feb. 9, 2009. Retrieved from the internet <URL: http://www.sadoun.com/Sat/Products/Dishnetwork/Dishes/Spot Beam short.pdf.

Saur, J., et al., "Interpretation of Galileo's 10 Plasma and Field Observations: 10, 124, and 127 Flybys and Close Polar Passes", Journal of Geophysical Research, Dec. 2002, vol. 107, No. A12, pp. SMP 5-1 to SMP 5-8.

Sultan, N., et al., "Erland Re-Use Concept: Figure of Merit for Frequency Re-Use Applied D to Mobile Satellite Systems", 1989, Space Technology, vol. 9, No. 4, pp. 375-381.

Vojcic, B., et al., "The Effect of Dual Satellite Diversity on the Total Capacity of Multiple Band-Shared COMA LEOS Systems", IEEE International Conference on Communications, 1994, ICC '94, SUPERCOMM/ICC '94, Conference Record, Serving Humanity Through Communications, vol. 2, pp. 1141-1144.

Wang, W., et al., "Multiple Frequency Reuse Schemes in the Two-Hop IEEE 802.16 Wireless Relay Networks with Asymmetrical Topology", Computer Communications, 2009, vol. 32, pp. 1298-1305.

Yabusaki, M., "Channel Reassignment Algorithm in Multiple Carrier Hopping TDMA Systems", IEEE Transactions on Communications, Feb. 1993, vol. 41, No. 2, pp. 381-390.

International Search Report and Written Opinion corresponding to PCT Application No. PCT/US2007/079567, dated Mar. 2, 2009, 15 pages total.

International Preliminary Report on Patentability corresponding to PCT Application No. PCT/US2007/079567, dated Mar. 31, 2009, 11 pages total.

International Search Report corresponding to PCT Application No. PCT/US2010/026934, dated May 11, 2010.

Non Final Office Action mailed Jun. 16, 2011 from U.S. Appl. No. 12/411,315.

Non Final Office Action mailed Jun. 23, 2011 from U.S. Appl. No. 12/406,870.

Non Final Office Action mailed Jun. 22, 2011 from U.S. Appl. No. 12/406,887.

Non Final Office Action mailed Oct. 17, 2011 from U.S. Appl. No. 12/406,861.

International Search Report and Written Opinion for PCT Application No. PCT/US2010/026934, mailed on May 11, 2010; 11 pages.

International Preliminary Report on Patentability and Written Opinion for PCT Application No. PCT/US2010/026934, mailed on Oct. 6, 2011; 10 pages.

International Preliminary Report on Patentability with Written Opinion for PCT Application No. PCT/US2007/079577, mailed on Mar. 31, 2009; 8 pages total.

Ntc of non-establishment of International Search Report, mailed Jul. 10, 2008 for PCT Application No. PCT/US2007/079577; 4 pages.

Notice of Allowance of Dec. 16, 2011 for U.S. Appl. No. 12/411,315; 14 pages.

Final Office Action of Dec. 14, 2011 for U.S. Appl. No. 12/411,704; 17 pages.

Non-Final Office Action of Nov. 30, 2011 for U.S. Appl. No. 12/406,870; 21 pages.

Interview Summary of Sep. 28, 2011 for U.S. Appl. No. 12/411,315, 3 pages.

Interview Summary of Sep. 14, 2011 for U.S. Appl. No. 12/406,870, 3 pages.

Non-Final Office Action of Jul. 18, 2011 for U.S. Appl. No. 12/411,704; 11 pages.

Atia, A.E., "KaBand Satellite System Architecture for Local Loop Internet Access", Microwave Symposium Digest, 2001 IEEE MTT-S International, May 20-25, 2001, Phoenix, AZ, vol. 2, pp. 1133-1136.

Atia, A.E., et al. "KaBand Satellite System Architecture for Local Loop Internet Access", Fifth KaBand Utilization Conference, Oct. 18-20, 1999, Proceedings (2000), Taormina, Italy, 7 pages.

Notice of Allowance of Mar. 16, 2012 for U.S. Appl. No. 12/406,870; 10 pages.

Evans, J.V., "Communication Satellite Systems for High-Speed Internet Access", IEEE Antennas and Propagation Magazine, Oct. 2001, vol. 43, No. 5, pp. 11-22.

Ohata, K., et al., "Broadband and Scalable Mobile Satellite Communication System for Future Access Networks", Acta Astronautica 57, 2005, pp. 239-249.

Bender, Raymond G. Jr., Counsel for Lockheed Martin Corporation, Re Application of Lockheed Martin Corporation for Authority to Launch and Operate a Global Satellite Communications System in Geostationary Orbit—Stop Code: 0800, Letter to the Federal Communications Commission submitting an application to launch and operate the Astrolink-Phase II™ Satellite Communications System, Dec. 22, 1997, 184 pages.

Interview Summary of Jan. 13, 2012 for U.S. Appl. No. 12/406,870, 3 pages.

Interview Summary of Mar. 20, 2012 for U.S. Appl. No. 12/411,704, 3 pages.

* cited by examiner

| Signal | 17.7 ~ 18.2 GHz | 19.7 ~ 20.2 GHz | 27.5 ~ 28.0 GHz | 29.5 ~ 30.0 GHz |
|---|---|---|---|---|
| Uplink Feeder Beam (4002) | | | LHCP RHCP | LHCP RHCP |
| Downlink Service Beams (4004) | LHCP* RHCP* | LHCP* RHCP* | | |
| Uplink Service Beams (4006) | | | LHCP* RHCP* | LHCP* RHCP* |
| Downlink Feeder Beam (4008) | LHCP RHCP | LHCP RHCP | | |

400

* frequency/polarization options for service beams

SATELLITE ARCHITECTURE

CROSS-REFERENCE TO RELATED APPLICATIONS

This application is a continuation application of co-pending International Application No. PCT/US2007/079567 filed Sep. 26, 2007.

This application also claims the benefit of, and incorporates by reference through the foregoing International Application, the following applications:

U.S. Provisional Application No. 60/827,959, filed Oct. 3, 2006,
U.S. Provisional Application No. 60/827,924, filed Oct. 3, 2006,
U.S. Provisional Application No. 60/827,927, filed Oct. 3, 2006,
U.S. Provisional Application No. 60/827,960, filed Oct. 3, 2006,
U.S. Provisional Application No. 60/827,964, filed Oct. 3, 2006.

This application also claims the benefit of U.S. Provisional Application No. 60/827,038, filed Sep. 26, 2006, through the foregoing International Application.

FIELD OF THE INVENTION

The present invention relates to wireless communications in general and, in particular, to a satellite communications network.

BACKGROUND OF THE INVENTION

Consumer broadband satellite services are gaining traction in North America with the start up of star network services using Ka band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

SUMMARY OF THE INVENTION

The present invention relates to a method for transmitting data in a satellite system having multiple spot beams. The method comprises sending a broadband signal in a forward direction from a gateway terminal to a communications satellite for relay to at least one subscriber terminal. The method further comprises receiving the broadband signal at the communications satellite, wherein the communications satellite comprises a bent pipe repeater having a plurality of satellite-based transmission amplifiers, each satellite-based transmission amplifier capable of performing amplification to generate a service spot beam. The method further comprises amplifying the broadband signal using one of the plurality of satellite-based transmission amplifiers to produce an amplified broadband signal, wherein the one of the plurality of satellite-based transmission amplifiers is employed to amplify only the broadband signal and no other broadband signal from the gateway terminal. The method further comprises sending the amplified broadband signal to the at least one subscriber terminal, the amplified broadband signal being sent as one of a plurality of service spot beams, the one of the plurality of service spot beams having an earth surface coverage area including the at least one subscriber terminal, wherein the amplified broadband signal alone occupies the one of the plurality of service spot beams. The method further comprises receiving and retrieving data from the amplified broadband signal at the at least one subscriber terminal.

In one embodiment, the amplified broadband signal is a single-carrier signal. The amplified broadband signal may support a data rate of at least 1 Gigabits per second (Gbps). The amplified broadband signal may have a bandwidth of at least 500 MHz.

Each of the plurality of satellite-based transmission amplifiers may comprise a traveling wave tube amplifier (TWTA). In one embodiment, the plurality of service spot beams comprises 60 service spot beams. The broadband signal sent from the gateway terminal to the communications satellite may be contained in one of a plurality of feeder beams sent from gateway terminals to the communications satellite. In one embodiment, the plurality of feeder beams comprises 15 feeder beams. Each of the plurality of feeder beams may contain 4 carriers each representing a separate signal sent in the forward direction from a gateway terminal to the communications satellite.

BRIEF DESCRIPTION OF THE DRAWINGS

FIG. 14 presents an illustrative frequency re-use plan that may be adopted in accordance with one embodiment of the invention.

DETAILED DESCRIPTION OF THE INVENTION

Various embodiments of the present invention comprise systems, methods, devices, and software for a novel broadband satellite network. This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, a number of steps may be required before, after, or concurrently with the following embodiments.

It should also be appreciated that the following systems, methods, devices, and software may be a component of a larger system, wherein other procedures may take precedence over or otherwise modify their application.

Figure 1A:
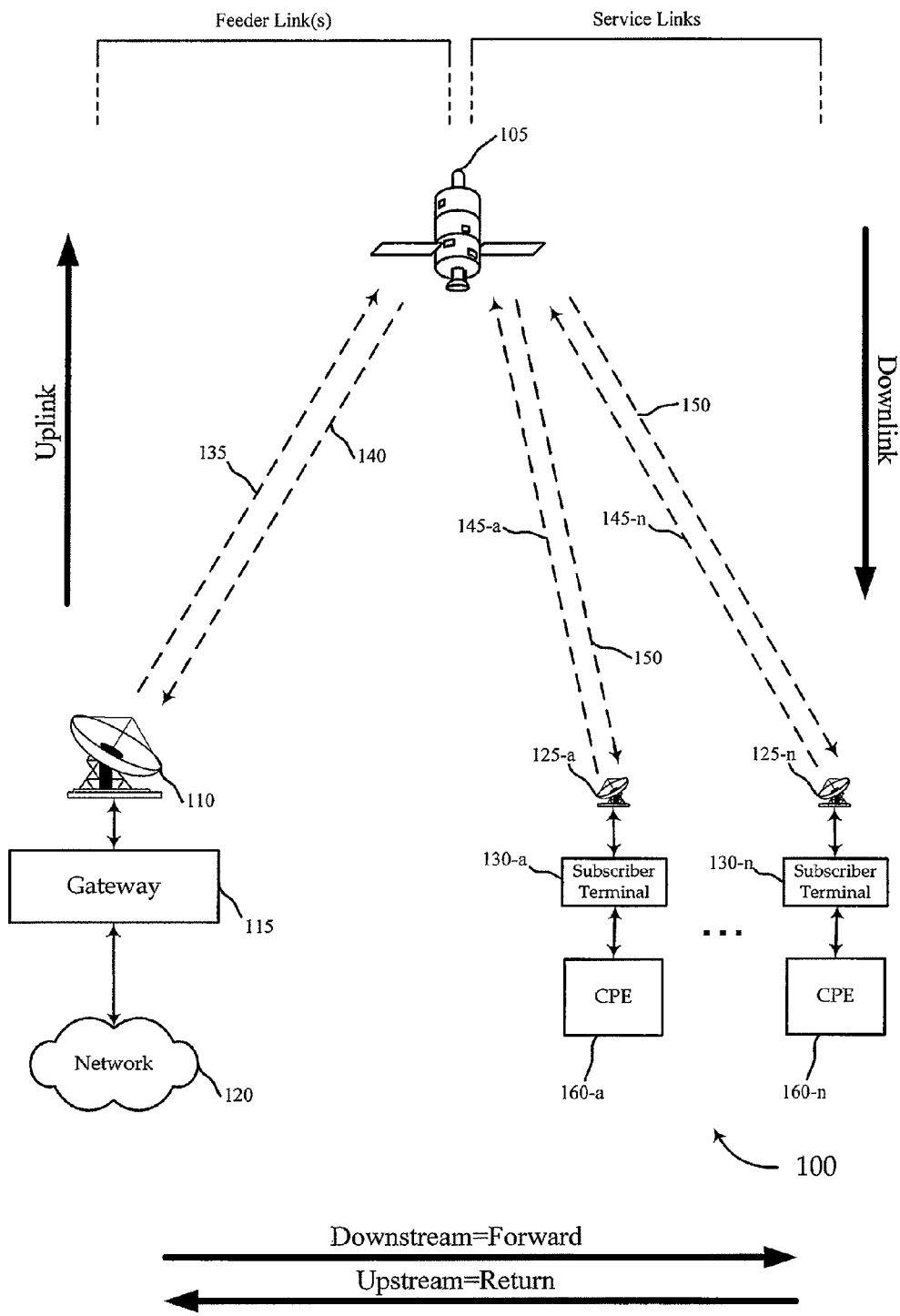
FIG. 1A is a block diagram of an exemplary satellite communications system configured according to various embodiments of the invention.

FIG. 1A is a block diagram of an exemplary satellite communications system 100 configured according to various embodiments of the invention. The satellite communications system 100 includes a network 120, such as the Internet, interfaced with a gateway 115 that is configured to communicate with one or more subscriber terminals 130, via a satellite 105. A gateway 115 is sometimes referred to as a hub or ground station. Subscriber terminals 130 are sometimes called modems, satellite modems or user terminals. As noted above, although the communications system 100 is illustrated as a geostationary satellite 105 based communication system, it should be noted that various embodiments described herein are not limited to use in geostationary satellite based systems, for example some embodiments could be low earth orbit (LEO) satellite based systems.

The network 120 may be any type of network and can include, for example, the Internet, an IP network, an intranet, a wide-area network ("WAN"), a local-area network ("LAN"), a virtual private network, the Public Switched Telephone Network ("PSTN"), and/or any other type of network supporting data communication between devices described herein, in different embodiments. A network 120 may include both wired and wireless connections, including optical links. Many other examples are possible and apparent to those skilled in the art in light of this disclosure. As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals) directed to a destination in the network 120, and can format the received signals for transmission along the network 120.

A device (not shown) connected to the network 120 may communicate with one or more subscriber terminals, and through the gateway 115. Data and information, for example IP datagrams, may be sent from a device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 and WiMAX standards. The link 135 from the gateway 115 to the satellite 105 may be referred to hereinafter as the downstream uplink 135.

The gateway 115 may use an antenna 110 to transmit the signal to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception of such signals. The satellite 105 may process the signals received from the gateway 115 and forward the signal from the gateway 115 containing the MAC frame to one or more subscriber terminals 130. In one embodiment, the satellite 105 operates in a multi-beam mode, transmitting a number of narrow beams each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), or any number of hybrid or other schemes known in the art.

A subscriber terminal, for example 130-a, may transmit data and information to a network 120 destination via the satellite 105. The subscriber terminal 130 transmits the signals via the upstream uplink 145-a to the satellite 105 using the antenna 125-a. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The link from the satellite 105 to the gateway 115 may be referred to hereinafter as the upstream downlink 140.

Figure 1B:
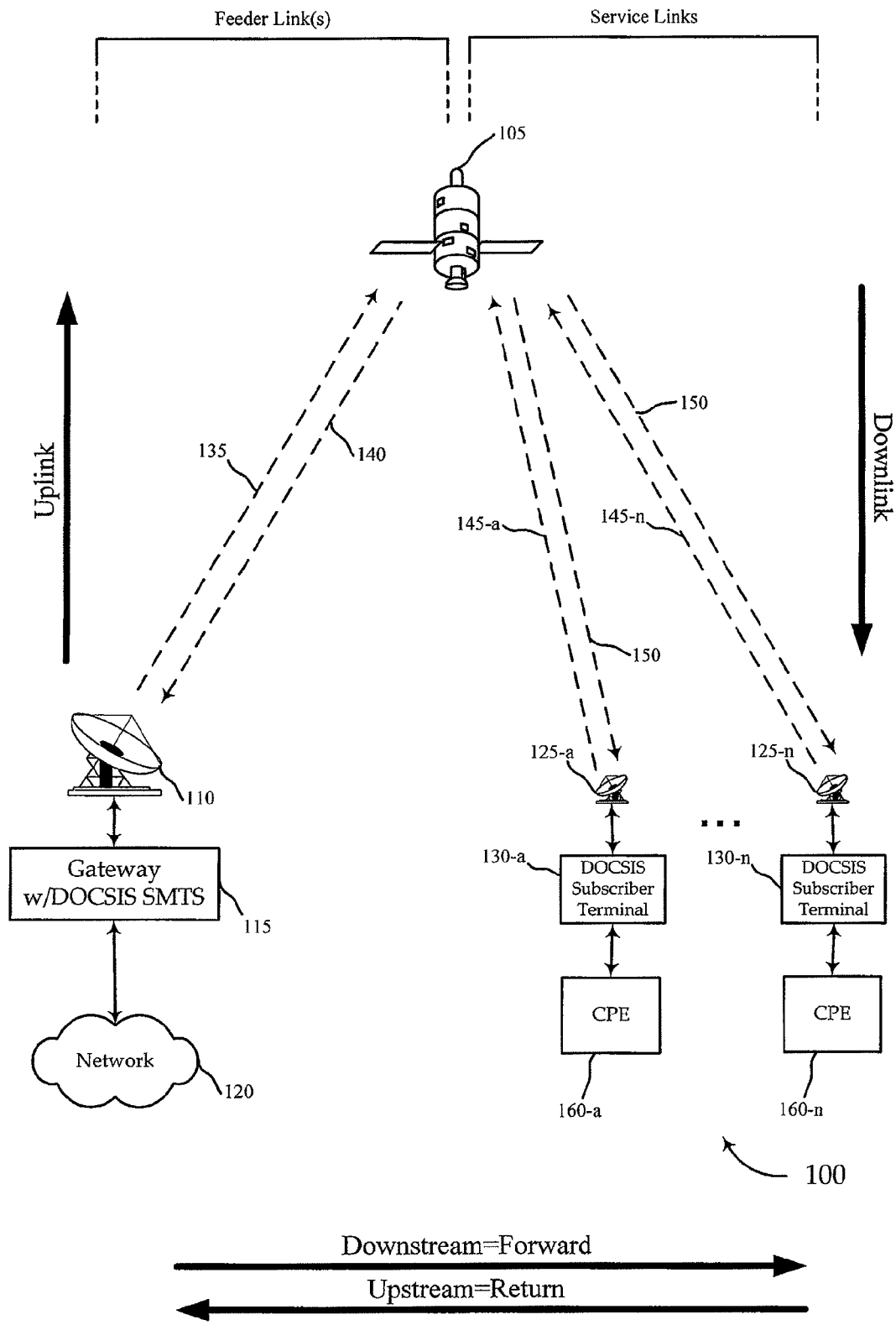
FIG. 1B is a block diagram illustrating an alternative embodiment of a satellite communication system.

Turning to FIG. 1B, a block diagram is shown illustrating an alternative embodiment of a satellite communication system 100. This communication system 100 may, for example, comprise the system 100 of FIG. 1A, but is in this instance described with greater particularity. In this embodiment, the gateway 115 includes a Satellite Modem Termination System (SMTS), which is based at least in part on the Data-Over-Cable Service Interface Standard (DOCSIS). The SMTS in this embodiment includes a bank of modulators and demodulators for transmitting signals to and receiving signals from subscriber terminals 130. The SMTS in the gateway 115 performs the real-time scheduling of the signal traffic through the satellite 105, and provides the interfaces for the connection to the network 120.

In this embodiment, the subscriber terminals 135 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) is used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a minimum number of space hardware elements. Spotbeam size and TWTA power may be optimized to achieve maximum flux density on the earth's surface of −118 decibel-watts per meter squared per megahertz ($dbW/m^2/MHz$). Thus, using approximately 2 bits per second per hertz (bits/s/Hz), there is approximately 1 Gbps of available bandwidth per spot beam.

Figure 12A:
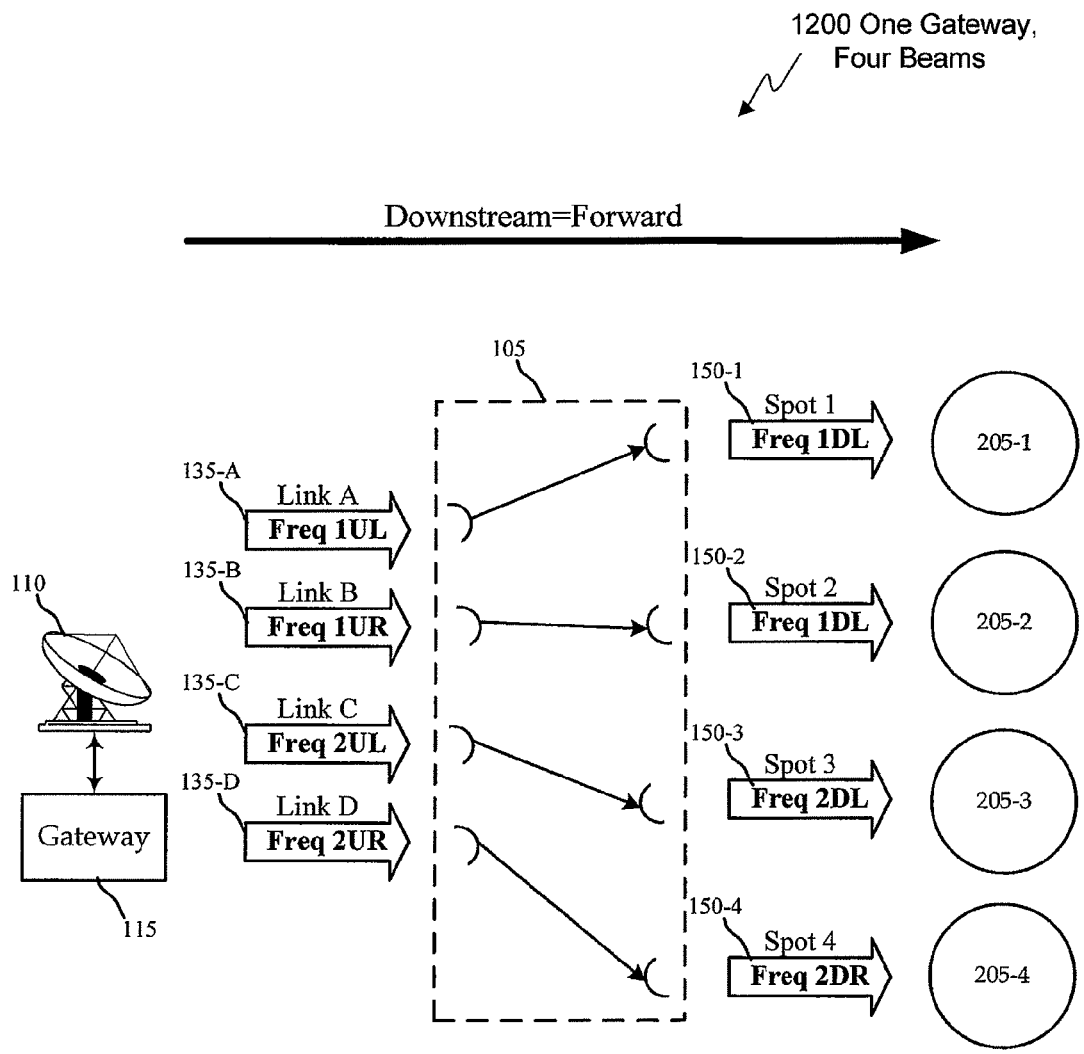
FIG. 12A illustrates an embodiment of a forward link distribution system.

With reference to FIG. 12A, an embodiment of a forward link distribution system 1200 is shown. The gateway 115 is shown coupled to an antenna 110, which generates four downstream signals. A single carrier with 500 MHz of spectrum is used for each of the four downstream uplinks 135. In this embodiment, a total of two-frequencies and two polarizations allow four separate downstream uplinks 135 while using only 1 GHz of the spectrum. For example, link A 135-A could be Freq 1U (27.5-28.0 GHz) with left-hand polarization, link B 135-B could be Freq 1U (27.5-28.0) GHz with right-hand polarization, link C could be Freq 2U (29.5-30 GHz) with left-hand polarization, and link D could be Freq 2U (29.5-30 GHz) with left-hand polarization.

The satellite 105 is functionally depicted as four "bent pipe" connections between a feeder and service link. Carrier signals can be changed through the satellite 105 "bent pipe" connections along with the orientation of polarization. The satellite 105 converts each downstream uplink 135 signal into a downstream downlink signal 150.

In this embodiment, there are four downstream downlinks 150 that each provides a service link for four spot beams 205. The downstream downlink 150 may change frequency in the bent pipe as is the case in this embodiment. For example, downstream uplink A 135-A changes from a first frequency (i.e., Freq 1U) to a second frequency (i.e., Freq 1D) through the satellite 105. Other embodiments may also change polarization between the uplink and downlink for a given downstream channel. Some embodiments may use the same polarization and/or frequency for both the uplink and downlink for a given downstream channel.

Figure 12B:
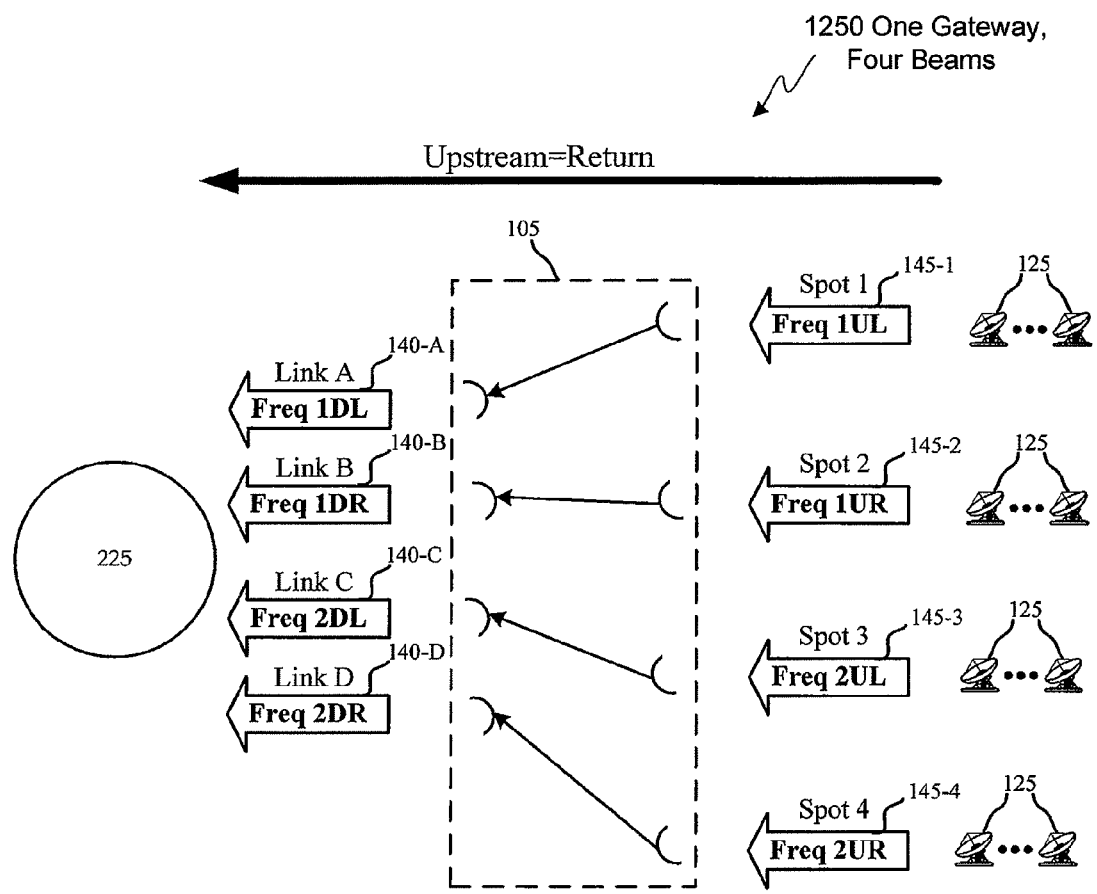
FIG. 12B illustrate an embodiment of a return link distribution system.

Referring next to FIG. 12B, an embodiment of a return link distribution system is shown. This embodiment shows four upstream uplinks 145 from four sets of subscriber terminals 125. A "bent pipe" satellite 105 takes the upstream uplinks 145, optionally changes carrier frequency and/or polarization (not shown), and then redirects them as upstream downlinks 140 to a spot beam for a gateway 115. In this embodiment, the carrier frequency changes between the uplink 145 and the downlink 140, but the polarization remains the same. Because the feeder spot beams to the gateway 115 is not in the coverage area of the service beams, the same frequency pairs may be reused for both service links and feeder links.

Figure 2A:
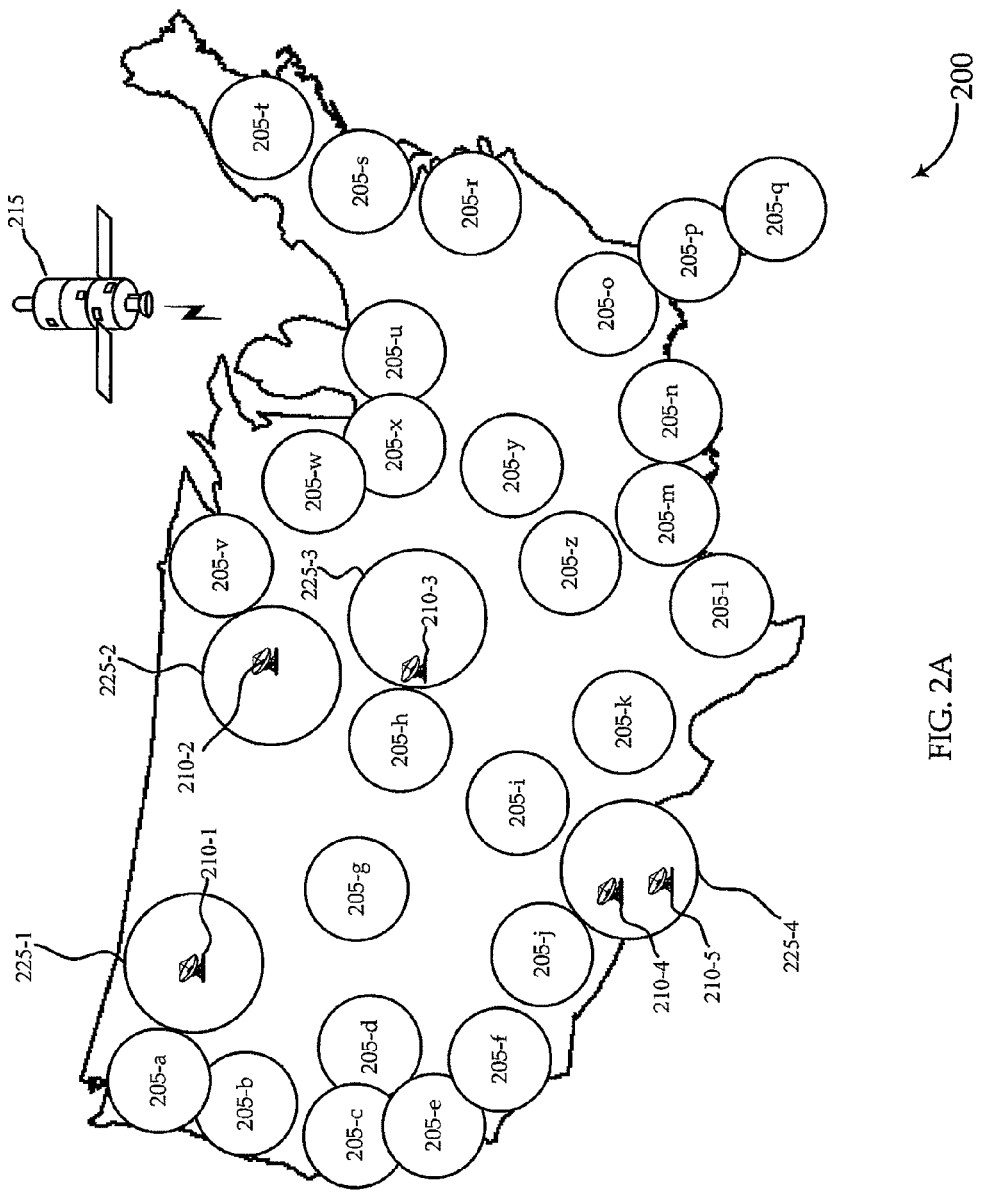
FIG. 2A is an example of a multi-beam system configured according to various embodiments of the invention are shown.
Figure 2B:
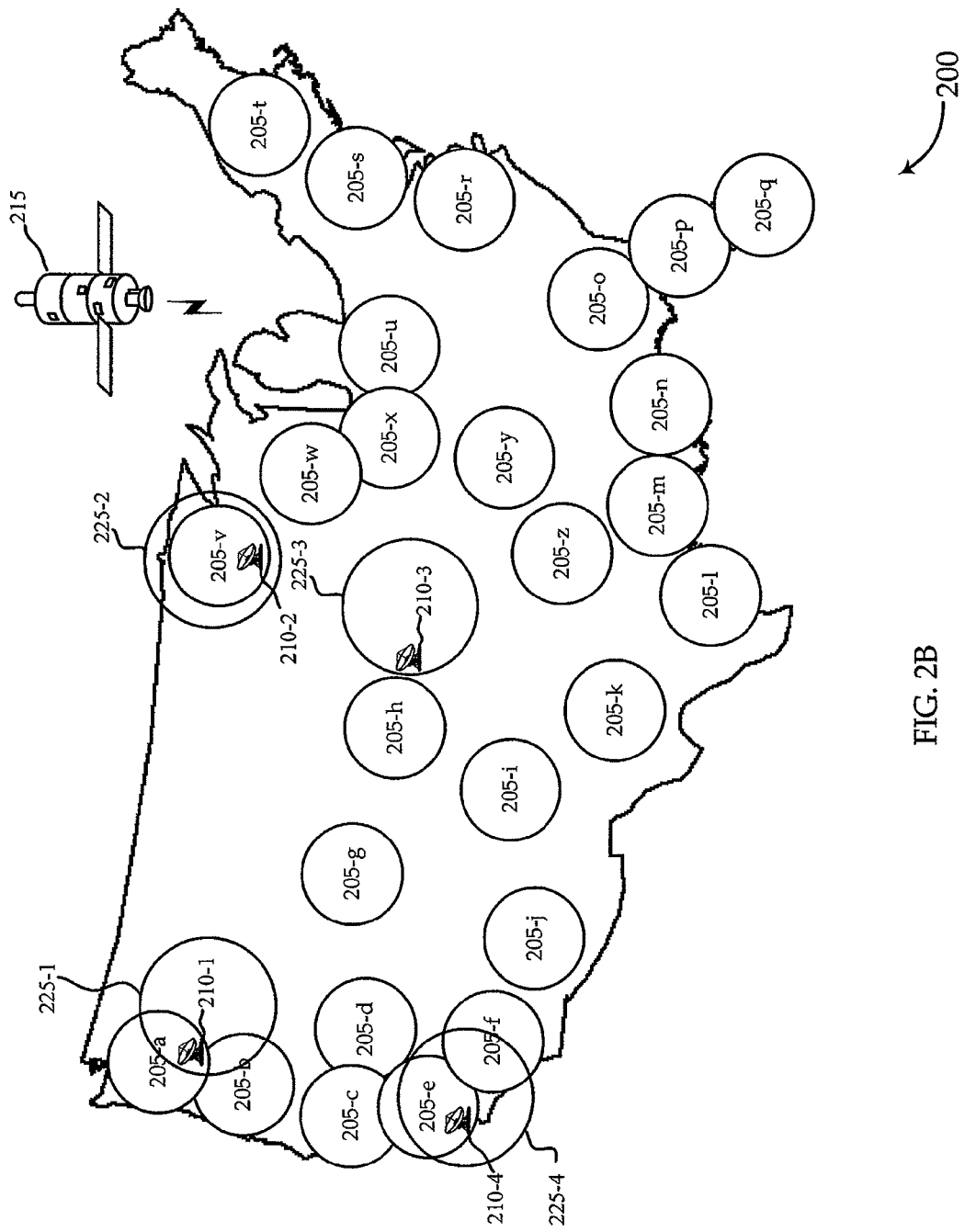
FIG. 2B is another example of a multi-beam system configured according to various embodiments of the invention are shown.

Turning to FIGS. 2A and 2B, examples of a multi-beam system 200 configured according to various embodiments of the invention are shown. The multi-beam system 200 may, for example, be implemented in the network 100 described in FIGS. 1A and 1B. Shown are the coverage of a number of feeder and service spot beam regions 225, 205. In this embodiment, a satellite 215 reuses frequency bands by isolating antenna directivity to certain regions of a country (e.g., United States, Canada or Brazil). As shown in FIG. 2A, there is complete geographic exclusivity between the feeder and service spot beams 205, 225. But that is not the case for FIG. 2B where there may in some instances be service spot beam overlap (e.g., 205-c, 205-d, 205-e), while there is no overlap in other areas. However, with overlap, there are certain interference issues that may inhibit frequency band re-use in the overlapping regions. A four color pattern allows avoiding interference even where there is some overlap between neighboring service beams 205.

In this embodiment, the gateway terminals 210 are also shown along with their feeder beams 225. As shown in FIG. 2B, the gateway terminals 210 may be located in a region covered by a service spotbeam (e.g., the first, second and fourth gateways 210-1, 210-2, 210-4). However, a gateway may also be located outside of a region covered by a service spotbeam (e.g., the third gateway 210-3). By locating gateway terminals 210 outside of the service spotbeam regions (e.g., the third gateway 210-3), geographic separation is achieved to allow for re-use of the allocated frequencies.

There are often spare gateway terminals 210 in a given feeder spot beam 225. The spare gateway terminal 210-5 can substitute for the primary gateway terminal 210-4 should the primary gateway terminal 210-4 fail to function properly. Additionally, the spare can be used when the primary is impaired by weather.

Figure 8:
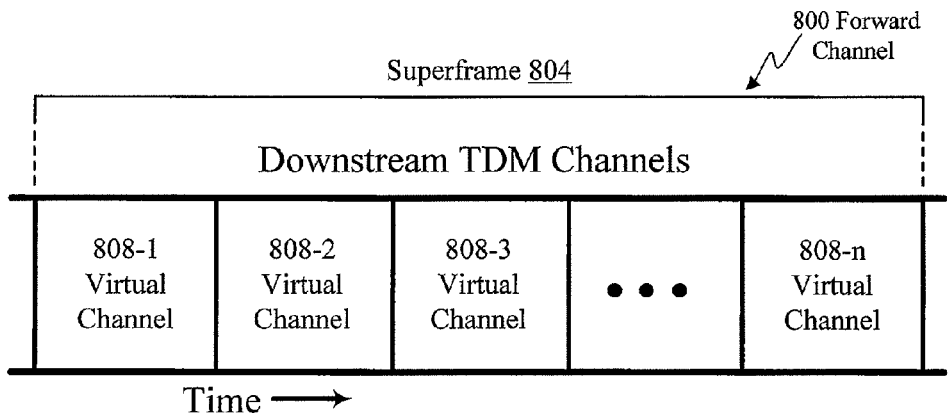
FIG. 8 shows an embodiment of a downstream channel.

Referring next to FIG. 8, an embodiment of a downstream channel 800 is shown. The downstream channel 800 includes a series of superframes 804 in succession, where each superframe 804 may have the same size or may vary in size. This embodiment divides a superframe 804 into a number of virtual channels 808(1-$n$). The virtual channels 808(1-$n$) in each superframe 804 can be the same size or different sizes. The size of the virtual channels 808(1-$n$) can change between different superframes 804. Different coding can be optionally used for the various virtual channels 808 (1-$n$). In some embodiments, the virtual channels are as short as one symbol in duration.

Figure 9:
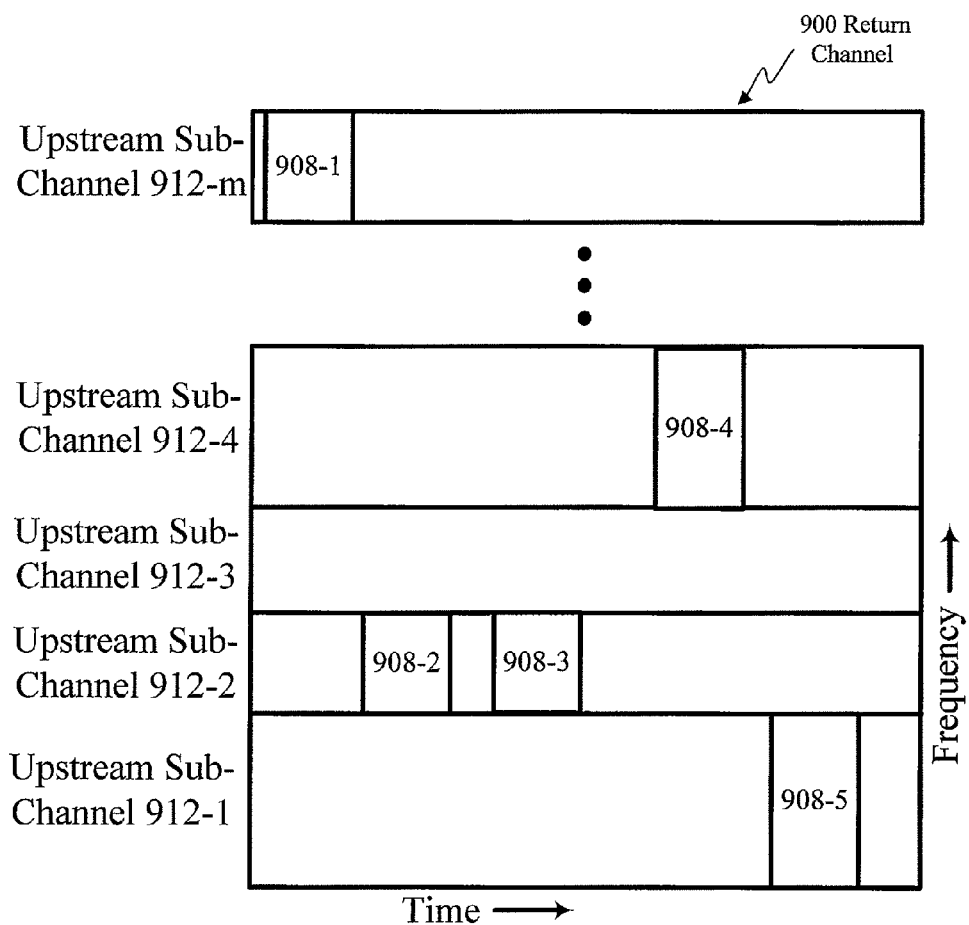
FIG. 9 shows an embodiment of an upstream channel.

With reference to FIG. 9, an embodiment of an upstream channel 900 is shown. This embodiment uses MF-TDMA, but other embodiments can use CDMA, OFDM, or other access schemes. The upstream channel 900 has 500 MHz of total bandwidth in one embodiment. The total bandwidth is divided into m frequency sub-channels, which may differ in bandwidth, modulation, coding, etc. and may also vary in time based on system needs.

In this embodiment, each subscriber terminal 130 is given a two-dimensional (2D) map to use for its upstream traffic. The 2D map has a number of entries where each indicates a frequency sub-channel 912 and time segment 908(1-5). For example, one subscriber terminal 130 is allocated sub-channel m 912-$m$, time segment one 908-1; sub-channel two 912-2, time segment two 908-2; sub-channel two 912-2, time segment three 908-3; etc. The 2D map is dynamically adjusted for each subscriber terminal 130 according to anticipated need by a scheduler in the SMTS.

Figure 13:
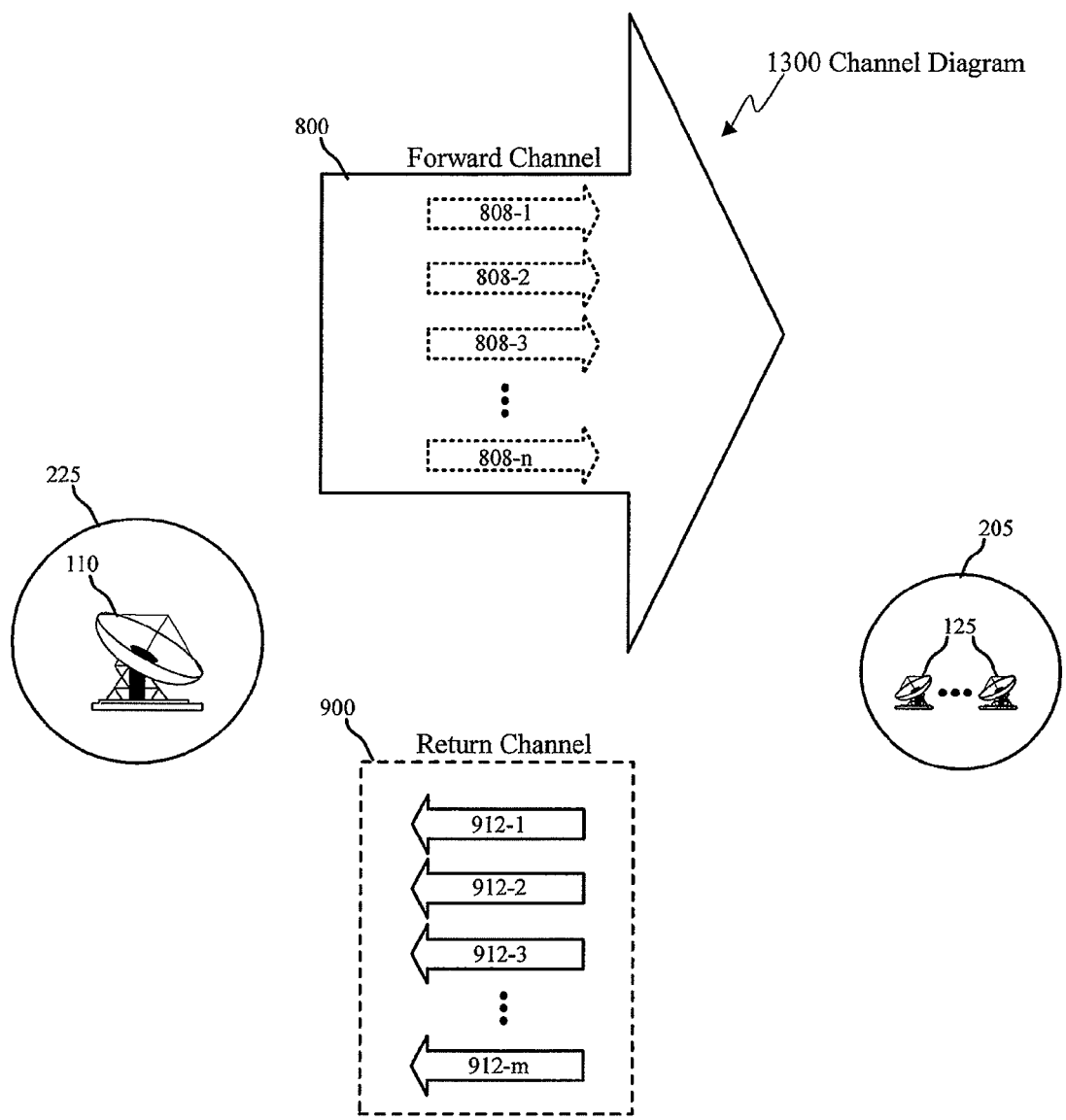
FIG. 13 shows an embodiment of a channel diagram.

Referring to FIG. 13, an embodiment of a channel diagram is shown. Only the channels for a single feeder spot beam 225 and a single service spot beam 205 are shown, but embodiments include many of each spot beam 225, 205 (e.g., various embodiments could have 60, 80, 100, 120, etc. of each type of spot beam 225, 205). The forward channel 800 includes n virtual channels 808 traveling from the gateway antenna 110 to the service spot beam 205. Each subscriber terminal 130 may be allocated one or more of the virtual channels 808. m MF-TDMA channels 912 make up the return channel 900 between the subscriber terminal (ST) antennas 125 and the feeder spot beam 225.

Figure 3:
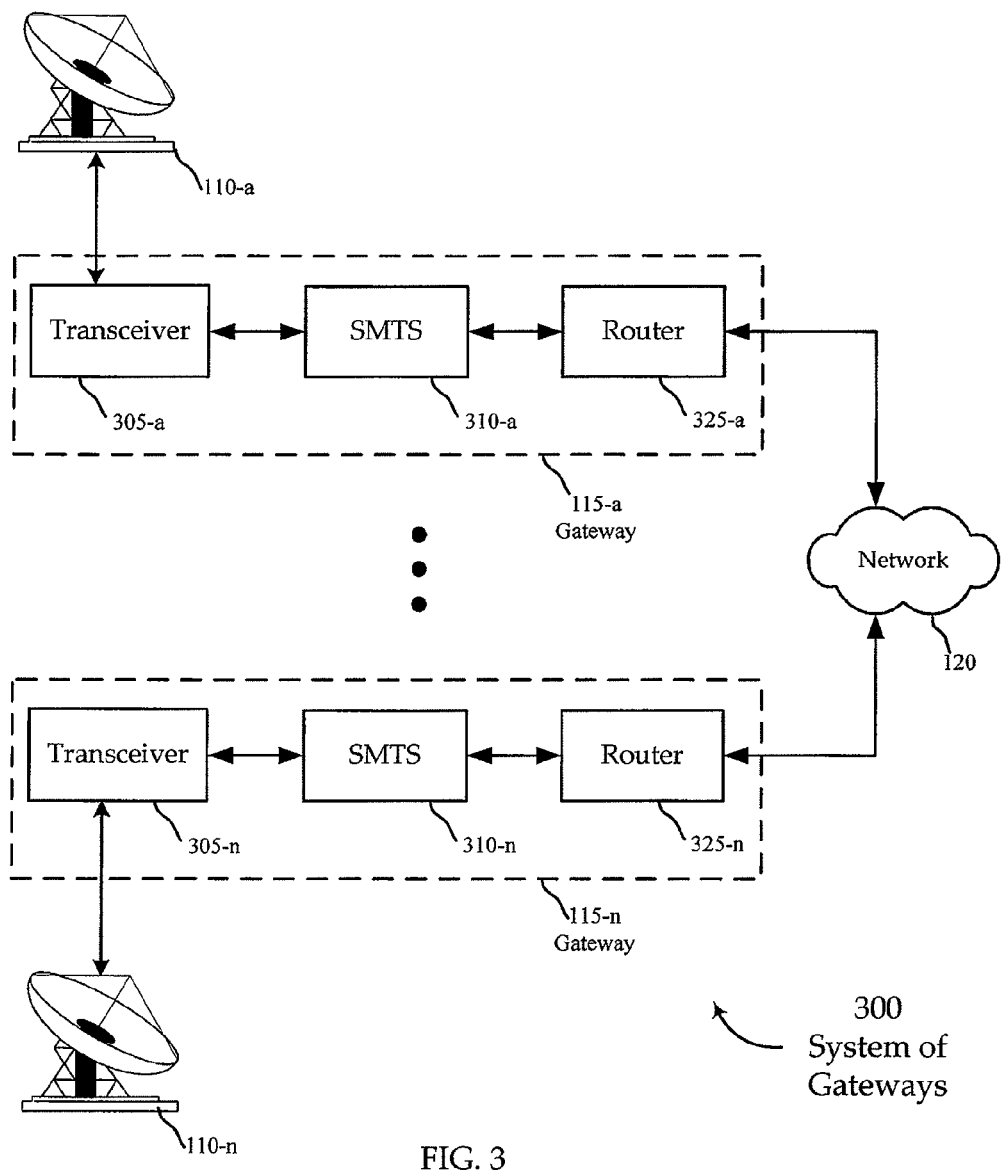
FIG. 3 presents an embodiment of a ground system of gateways shown in block diagram form.

Referring next to FIG. 3, an embodiment of a ground system 300 of gateways 115 is shown in block diagram form. One embodiment could have fifteen active gateways 115 (and possibly spares) to generate sixty service spot beams, for example. The ground system 300 includes a number of gateways 115 respectively coupled to antennas 110. All the gateways 115 are coupled to a network 120 such as the Internet. The network is used to gather information for the subscriber terminals. Additionally, each SMTS communicates with other SMTS and the Internet using the network 120 or other means not shown.

Each gateway 115 includes a transceiver 305, a SMTS 310 and a router 325. The transceiver 305 includes both a transmitter and a receiver. In this embodiment, the transmitter takes a baseband signal and upconverts and amplifies the baseband signal for transmission of the downstream uplinks 135 with the antenna 110. The receiver downconverts and tunes the upstream downlinks 140 along with other processing as explained below. The SMTS 310 processes signals to allow the subscriber terminals to request and receive information and schedules bandwidth for the forward and return channels 800, 900. Additionally, the SMTS 310 provides configuration information and receives status from the subscriber terminals 130. Any requested or returned information is forwarded via the router 325.

Figure 11:
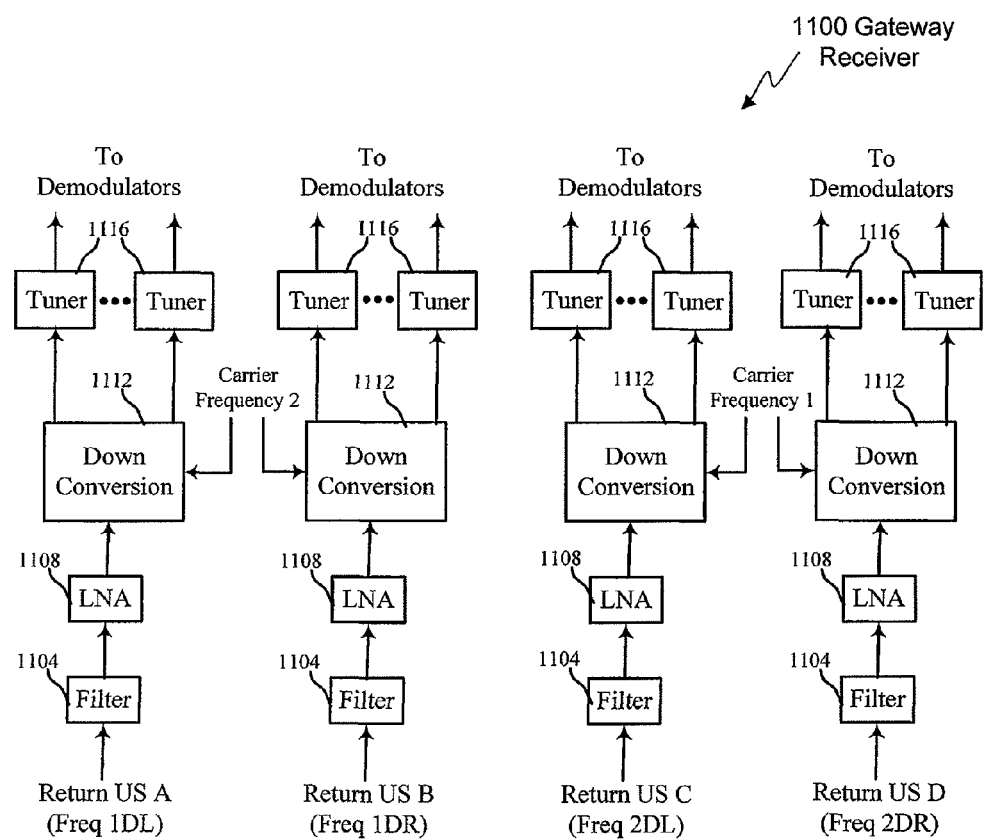
FIG. 11 shows an embodiment of gateway receiver.

With reference to FIG. 11, an embodiment of gateway receiver 1100 is shown. This embodiment of the receiver 1100 processes four return channels 900 from four different service spot beams 205. The return channels 900 may be divided among four pathways using antenna polarization and/or filtering 1104. Each return channel is coupled to a low-noise amplifier (LNA) 1108. Down conversion 1112 mixes down the signal into its intermediate frequency. Each of the upstream sub-channels 912 is separated from the signal by a number of tuners 1116. Further processing is performed in the SMTS 310.

Figure 10:
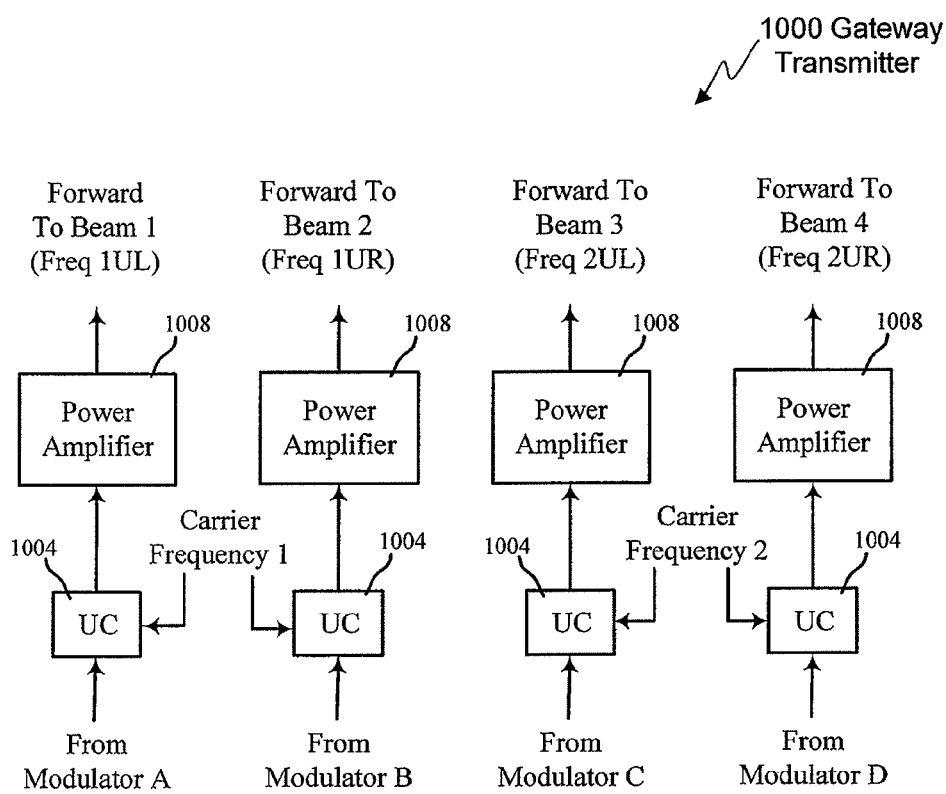
FIG. 10 shows an embodiment of a gateway transmitter.

Referring next to FIG. 10, an embodiment of a gateway transmitter 1000 is shown. The downstream channels 800 are received at their intermediate frequencies from the SMTS 310. With separate pathways, each downstream channel 800 is up-converted 1004 using two different carrier frequencies. A power amplifier 1008 increases the amplitude of the forward channel 900 before coupling to the antenna 110. The antenna 110 polarizes the separate signals to keep the four forward channels 800 distinct as they are passed to the satellite 105.

Figure 4:
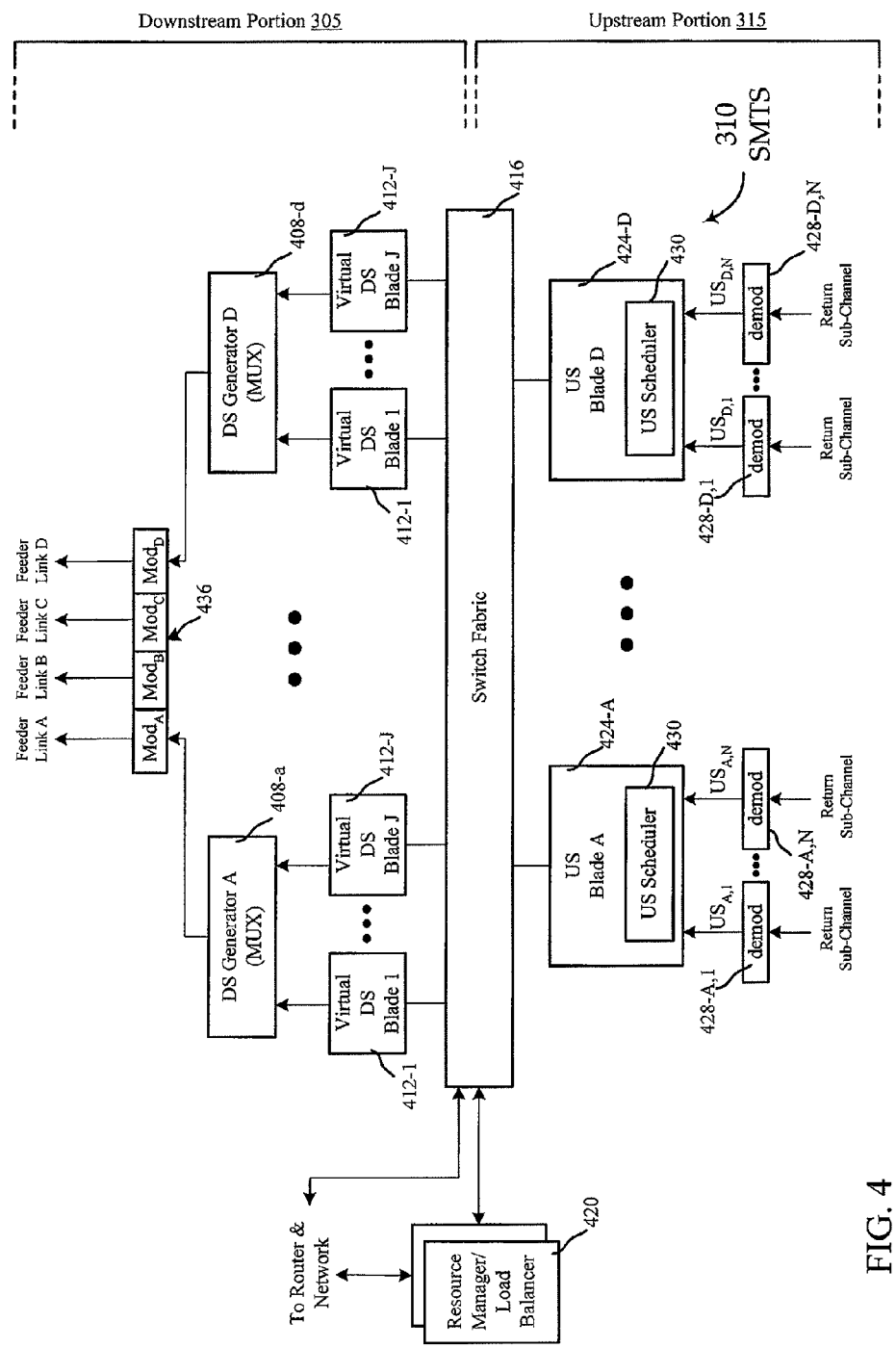
FIG. 4 presents an embodiment of a SMTS shown in block diagram form.

With reference to FIG. 4, an embodiment of a SMTS 310 is shown in block diagram form. Baseband processing is done for the inbound and outbound links 135, 140 by a number of geographically separated gateways 115. Each SMTS 310 is generally divided into two sections, specifically, the downstream portion 305 to send information to the satellite 105 and the upstream portion 315 to receive information from the satellite 105.

The downstream portion 305 takes information from the switching fabric 416 through a number of downstream (DS) blades 412. The DS blades 412 are divided among a number of downstream generators 408. This embodiment includes four downstream generators 408, with one for each of the downstream channels 800. For example, this embodiment uses four separate 500 MHz spectrum ranges having different frequencies and/or polarizations. A four-color modulator 436 has a modulator for each respective DS generator 408. The modulated signals are coupled to the transmitter portion 1000 of the transceiver 305 at an intermediate frequency. Each of the four downstream generators 408 in this embodiment has J virtual DS blades 412.

The upstream portion 315 of the SMTS 310 receives and processes information from the satellite 105 in the baseband intermediate frequency. After the receiver portion 1100 of the transceiver 305 produces all the sub-channels 912 for the four separate baseband upstream signals, each sub-channel 912 is coupled to a different demodulator 428. Some embodiments could include a switch before the demodulators 428 to allow any return link sub-channel 912 to go to any demodulator 428 to allow dynamic reassignment between the four return channels 908. A number of demodulators are dedicated to an upstream (US) blade 424.

The US blades 424 serve to recover the information received from the satellite 105 before providing it to the switching fabric 416. The US scheduler 430 on each US blade 424 serves to schedule use of the return channel 900 for each subscriber terminal 130. Future needs for the subscriber terminals 130 of a particular return channel 900 can be assessed and bandwidth/latency adjusted accordingly in cooperation with the Resource Manager and Load Balancer (RM/LB) block 420.

The RM/LB block 420 assigns traffic among the US and DS blades. By communication with other RM/LB blocks 420 in other SMTSes 310, each RM/LB block 420 can reassign subscriber terminals 130 and channels 800, 900 to other gateways 115. This reassignment can take place for any number of reasons, for example, lack of resources and/or loading concerns. In this embodiment, the decisions are done in a distributed fashion among the RM/LB blocks 420, but other embodiments could have decisions made by one master MR/LB block or at some other central decision-making authority. Reassignment of subscriber terminals 130 could use overlapping service spot beams 205, for example.

Figure 5:
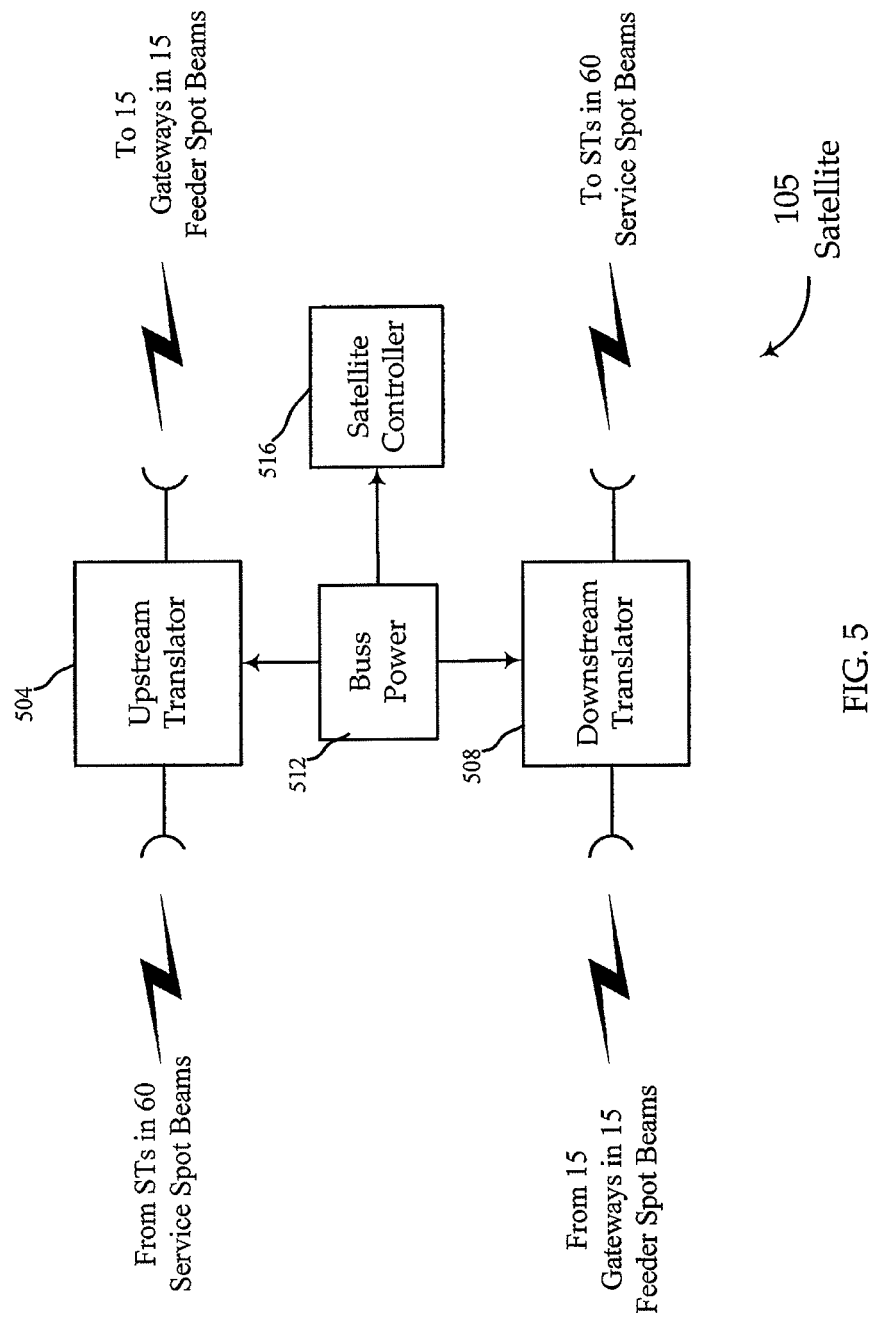
FIG. 5 presents an embodiment of a satellite shown in block diagram form.

Referring next to FIG. 5, an embodiment of a satellite 105 is shown in block diagram form. The satellite 105 in this embodiment communicates with fifteen gateways 115 and all STs 130 using sixty feeder and service spot beams 225, 205. Other embodiments could use more or less gateways/spot beams. Buss power 512 is supplied using a power source such as chemical fuel, nuclear fuel and/or solar energy. A satellite controller 516 is used to maintain attitude and otherwise control the satellite 105. Software updates to the satellite 105 can be uploaded from the gateway 115 and performed by the satellite controller 516.

Information passes in two directions through the satellite 105. A downstream translator 508 receives information from the fifteen gateways 115 for relay to subscriber terminals 130 using sixty service spot beams 205. An upstream translator 504 receives information from the subscriber terminals 130 occupying the sixty spot beam areas and relays that information to the fifteen gateways 115. This embodiment of the satellite can switch carrier frequencies in the downstream or upstream processors 508, 504 in a "bent-pipe" configuration, but other embodiments could do baseband switching between the various forward and return channels 800, 900. The frequencies and polarization for each spot beam 225, 205 could be programmable or preconfigured.

Figure 6A:
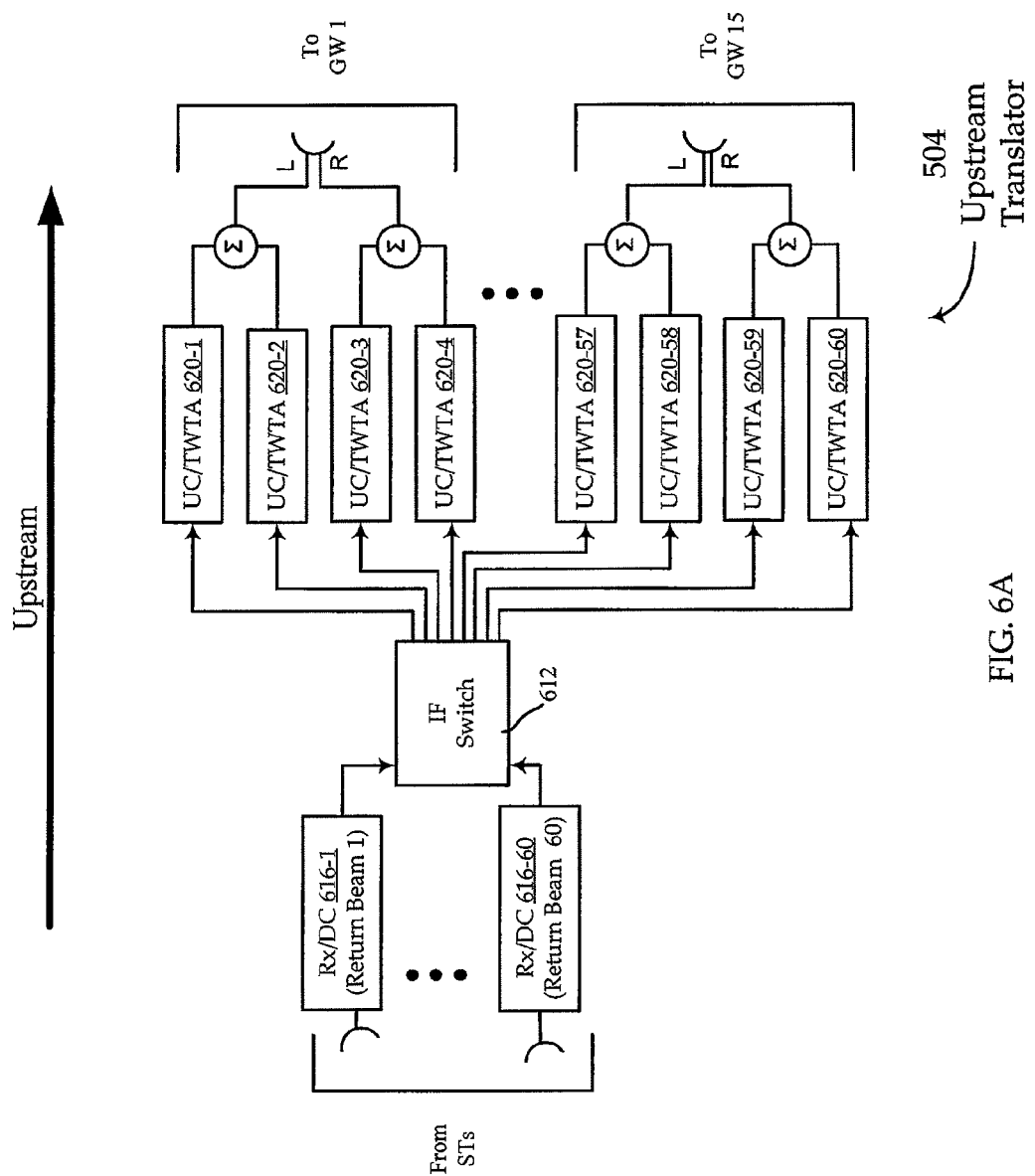
FIG. 6A presents an embodiment of an upstream translator shown in block diagram form.

With reference to FIG. 6A, an embodiment of an upstream translator 504 is shown in block diagram form. A Receiver and Downconverter (Rx/DC) block 616 receives all the return link information for the area defined by a spot beam 205 as an analog signal before conversion to an intermediate frequency (IF). There is a Rx/DC block 616 for each service spot beam area 205. An IF switch 612 routes a particular baseband signal from a Rx/DC block 616 to a particular upstream downlink channel. The upstream downlink channel is filled using an Upconverter and Traveling Wave Tube Amplifier (UC/TWTA) block 620. The frequency and/or polarization can be changed through this process such that each upstream channel passes through the satellite 105 in a bent pipe fashion.

Each gateway 115 has four dedicated UC/TWTA blocks 620 in the upstream translator 504. Two of the four dedicated UC/TWTA blocks 620 operate at a first frequency range and two operate at a second frequency range in this embodiment. Additionally, two use right-hand polarization and two use left-hand polarization. Between the two polarizations and two frequencies, the satellite 105 can communicate with each gateway 115 with four separate upstream downlink channels.

Figure 6B:
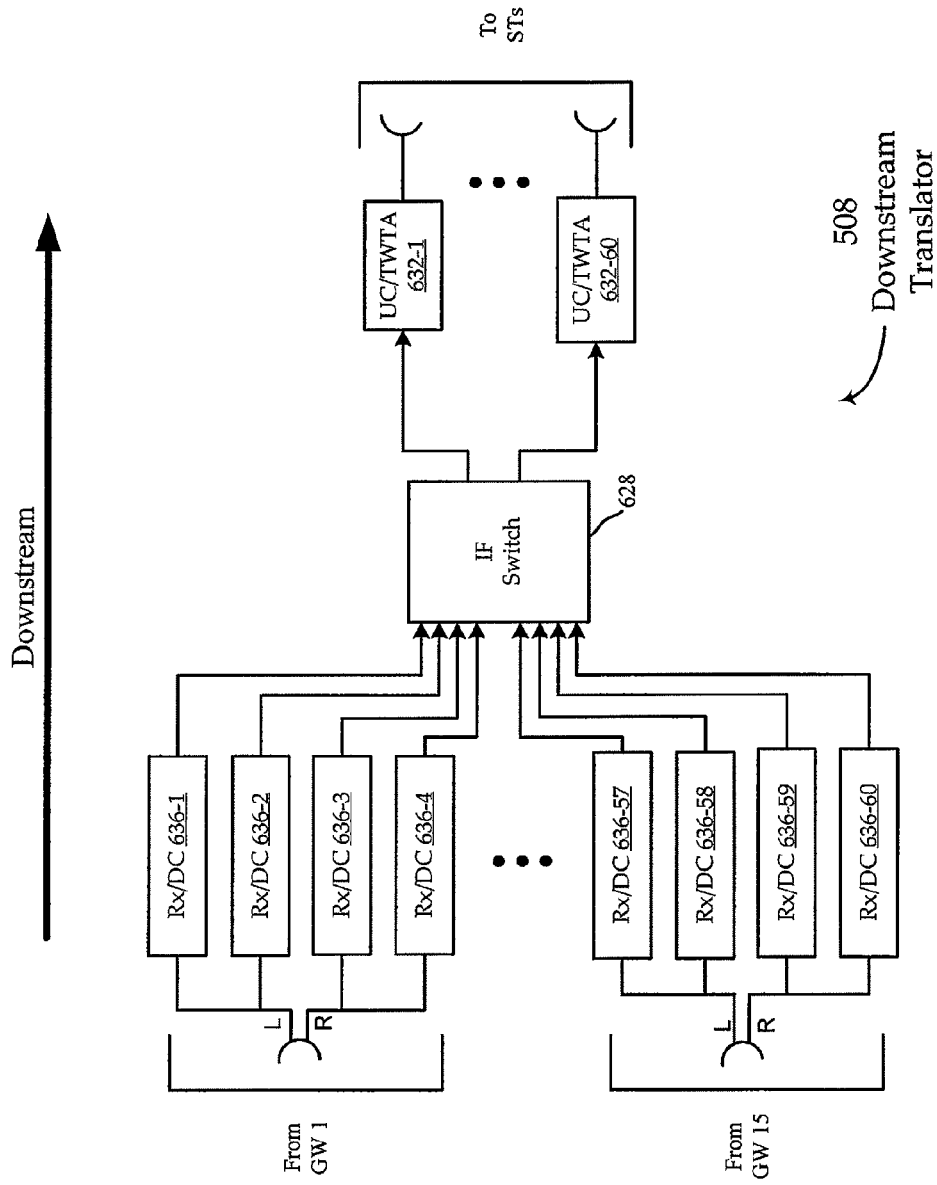
FIG. 6B presents an embodiment of a downstream translator shown as a block diagram.

Referring next to FIG. 6B, an embodiment of a downstream translator 508 is shown as a block diagram. Each gateway 115 has four downstream uplink channels to the satellite 105 by use of two frequency ranges and two polarizations. A Rx/DC block 636 takes the analog signal and converts the signal to an intermediate frequency. There is a Rx/DC block 636 for all sixty downstream uplink channels from the fifteen gateways 115. The IF switch 612 connects a particular channel 800 from a gateway 115 to a particular service spot beam 205. Each IF signal from the switch 628 is modulated and amplified with a UC/TWTA block 632. An antenna broadcasts the signal using a spot beam to subscriber terminals 130 that occupy the area of the spot beam. Just as with the upstream translator 504, the downstream translator 508 can change carrier frequency and polarization of a particular downstream channel in a bent-pipe fashion.

Figure 7:
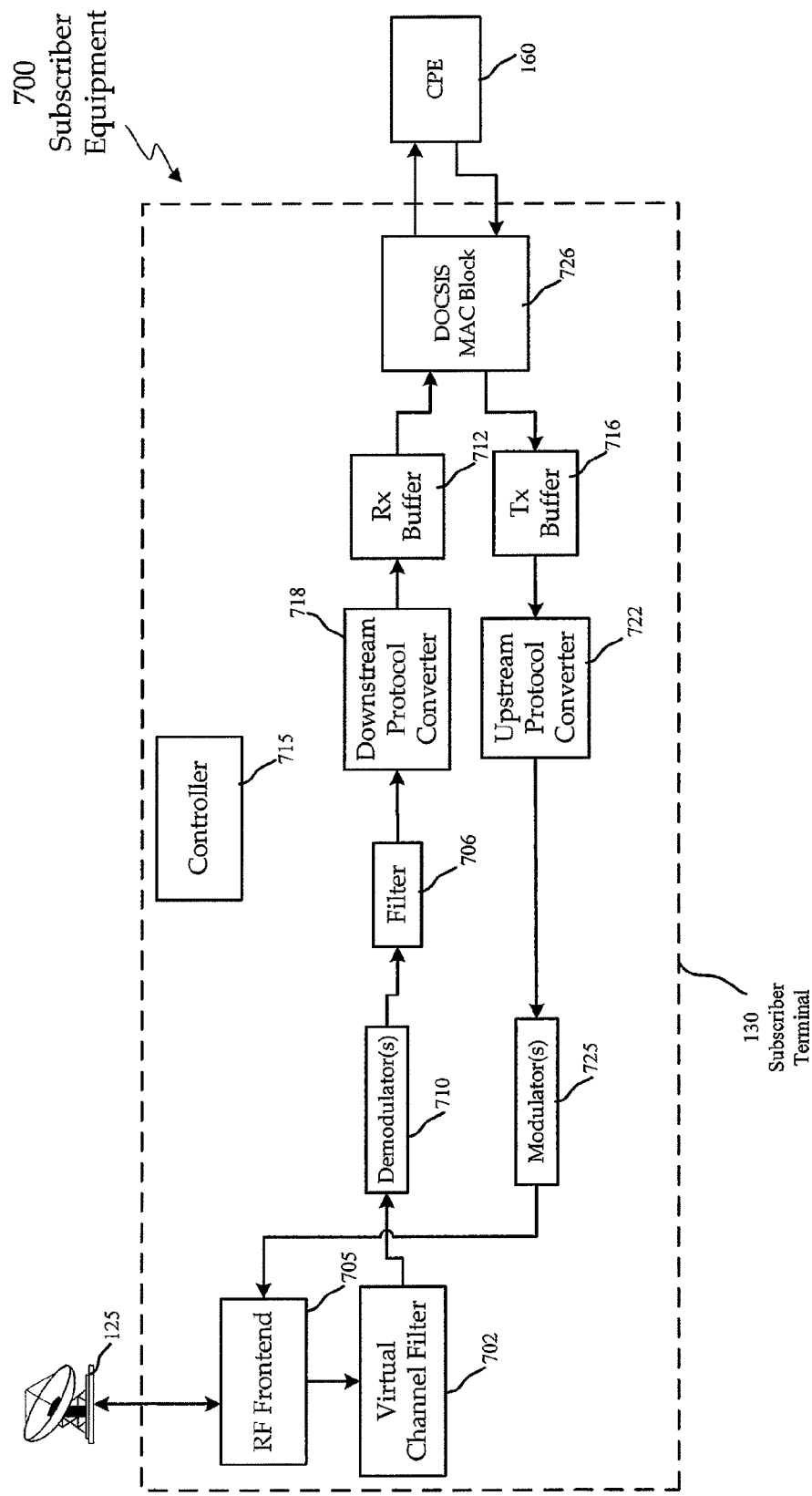
FIG. 7 is a block diagram illustrating a set of subscriber equipment which may be located at a subscriber location for the reception and transmission of communication signals.

FIG. 7 comprises a block diagram illustrating a set of subscriber equipment 700 which may be located at a subscriber location for the reception and transmission of communication signals. Components of this set of subscriber equipment 700 may, for example, comprise the antenna 125, associated subscriber terminal 130 and any consumer premises equipment (CPE) 160, which may be a computer, a network, etc.

An antenna 125 may receive signals from a satellite 105. The antenna 125 may comprise a VSAT antenna, or any of a variety other antenna types (e.g., other parabolic antennas, microstrip antennas, or helical antennas). In some embodiments, the antenna 125 may be configured to dynamically modify its configuration to better receive signals at certain frequency ranges or from certain locations. From the antenna 125, the signals are forwarded (perhaps after some form of processing) to the subscriber terminal 130. The subscriber terminal 130 may include a radio frequency (RF) frontend 705, a controller 715, a virtual channel filter 702, a modulator 725, a demodulator 710, a filter 706, a downstream protocol converter 718, an upstream protocol converter 722, a receive (Rx) buffer 712, and a transmit (Tx) buffer 716.

In this embodiment, the RF frontend 705 has both transmit and receive functions. The receive function includes amplification of the received signals (e.g., with a low noise amplifier (LNA)). This amplified signal is then downconverted (e.g., using a mixer to combine it with a signal from a local oscillator (LO)). This downconverted signal may be amplified again with the RF frontend 705, before processing of the superframe 804 with the virtual channel filter 702. A subset of each superframe 804 is culled from the downstream channel 800 by the virtual channel filter 702, for example, one or more virtual channels 808 are filtered off for further processing.

A variety of modulation and coding techniques may be used at the subscriber terminal 130 for signals received from and transmitted to a satellite. In this embodiment, modulation techniques include BPSK, QPSK, 8PSK, 16APSK, 32PSK. In other embodiments, additional modulation techniques may include ASK, FSK, MFSK, and QAM, as well as a variety of analog techniques. The demodulator 710 may demodulate the down-converted signals, forwarding the demodulated virtual channel 808 to a filter 706 to strip out the data intended for the particular subscriber terminal 130 from other information in the virtual channel 808.

Once the information destined for the particular subscriber terminal 130 is isolated, a downstream protocol converter 718 translates the protocol used for the satellite link into one that the DOCSIS MAC block 726 uses. Alternative embodiments could use a WiMAX MAC block or a combination DOCSIS/ WiMAX block. A Rx buffer 712 is used to convert the high-speed received burst into a lower-speed stream that the DOCSIS MAC block 726 can process. The DOCSIS MAC block 726 is a circuit that receives a DOCSIS stream and manages it for the CPE 160. Tasks such as provisioning, bandwidth management, access control, quality of service, etc. are managed by the DOCSIS MAC block 726. The CPE can often interface with the DOCSIS MAC block 726 using Ethernet, WiFi, USB and/or other standard interfaces. In some embodiments, a WiMax block 726 could be used instead of a DOCSIS MAC block 726 to allow use of the WiMax protocol.

It is also worth noting that while a downstream protocol converter 718 and upstream protocol converter 722 may be used to convert received packets to DOCSIS or WiMax compatible frames for processing by a MAC block 726, these converters will not be necessary in many embodiments. For example, in embodiments where DOCSIS or WiMax based components are not used, the protocol used for the satellite link may also be compatible with the MAC block 726 without such conversions, and the converters 718, 722 may therefore be excluded.

Various functions of the subscriber terminal 130 are managed by the controller 715. The controller 715 may oversee a variety of decoding, interleaving, decryption, and unscrambling techniques, as known in the art. The controller may also manage the functions applicable to the signals and exchange of processed data with one or more CPEs 160. The CPE 160 may comprise one or more user terminals, such as personal computers, laptops, or any other computing devices as known in the art.

The controller 715, along with the other components of the subscriber terminal 130, may be implemented in one or more Application Specific Integrated Circuits (ASICs), or a general purpose processor adapted to perform the applicable functions. Alternatively, the functions of the subscriber terminal 130 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The controller may be programmed to access memory unit (not shown). It may fetch instructions and other data from the memory unit, or write data to the memory-unit.

As noted above, data may also be transmitted from the CPE 160 through the subscriber terminal 130 and up to a satellite 105 in various communication signals. The CPE 160, therefore, may transmit data to DOCSIS MAC block 726 for conversion to the DOCSIS protocol before that protocol is translated with an upstream protocol converter 722. The slow-rate data waits in the Tx buffer 716 until it is burst over the satellite link.

The processed data is then transmitted from the Tx buffer 716 to the modulator 725, where it is modulated using one of the techniques described above. In some embodiments, adaptive or variable coding and modulation techniques may be used in these transmissions. Specifically, different modulation and coding combinations, or "modcodes," may be used for different packets, depending on the signal quality metrics from the antenna 125 to the satellite 105. Other factors, such as network and satellite congestion issues, may be factored into the determination, as well. Signal quality information may be received from the satellite or other sources, and various decisions regarding modcode applicability may be made locally at the controller, or remotely. The RF frontend 705 may then amplify and upconvert the modulated signals for transmission through the antenna 125 to the satellite.

Satellite Architecture

According to an embodiment of the invention, a novel architecture is presented for establishing a multi-beam satellite communication system having both forward links and return links connecting gateways and subscriber terminals. Such a multi-beam satellite communication system is illustrated in the figures. For example, referring to FIGS. 1A and 1B, a gateway 115 sends a forward link signal to one or more subscriber terminals 130-a through 130-n via satellite 105. Here, a forward link refers to signals sent from a gateway to one or more subscriber terminals. Such gateway-to-subscriber signals are also sometimes referred to as downstream signals. In the reverse direction, the one or more subscriber terminals 130-a through 130-n send one or more return link signals to gateway 115. Such subscriber-to-gateway signals are also sometimes referred to as upstream signals.

One of the many uses of the systems such as that shown in FIGS. 1A and 1B may be to provide network access (e.g., Internet access) to the subscriber terminals. For example, a subscriber terminal 130-a may request a web page on the Internet by sending a network request using a return link (upstream) signal (145-a, 140) to gateway 115 via satellite 105. Gateway 115 responds by retrieving the requested web page from network 120, which may directly or indirectly connected to the Internet. Gateway 115 then sends the requested web page using a forward link (downstream) signal (135, 150) to subscriber terminal 130-a via satellite 105, thus completing the web page request and response. Different layers of networking protocol operations may be implemented in the process, as is known to one of ordinary skill in the art.

According to the present embodiment of the invention, satellite 105 comprises a bent pipe repeater that is capable of receiving one or more signals from Earth and transmitting the signals back toward Earth, possibly after frequency translation and polarization modification. For example, each signal received at satellite 105 at a particular frequency and polarization may be transmitted out of satellite 105 at a different frequency and/or polarization. The bent pipe repeater may also provide switching operations, such that different "feeder signals" (i.e., signals sent to and from gateways) may be switched to be connected to different "service signals" (i.e., signals sent to and from subscriber terminals). The bent pipe repeater does not demodulate signals received at the satellite into data such as bits and re-modulate the data for transmission. This is in contrast to processing repeaters, which are capable of performing such demodulation and re-modulation to achieve gains in error correction performance. Even though processing repeaters are commercially available, a bent pipe repeater is adopted to achieve optimal efficiency in forward link and return link communications in accordance with the present embodiment of the invention.

Referring to FIG. 6B, satellite components for handling forward links in the downstream direction from gateways to subscriber terminals may be implemented as shown in accordance with one embodiment of the invention. Here, 15 gateways together send 60 forward link signals to the satellite. Specifically, each gateway sends an uplink feeder beam comprising 4 different forward link signals utilizing an antenna. Each of the 4 forward link signals is transmitted using a different combination of frequency band and polarization. Each unique combination is referred to as a specific "color,"

as discussed previously. Each forward link signal is received at the satellite at a particular receiver module 636. Each receiver module 636 may include a receiver such as a low noise amplifier (LNA) followed by a downconverter (DC) that converts the forward link signal to a convenient frequency, such as an intermediate frequency (IF).

According to an embodiment of the invention, each forward link signal is a broadband signal. Here, the term "broadband" is used in the context of satellite communications and specifically refers to a signal having a bandwidth of at least 250 MHz. For example, in the present embodiment, each forward link signal is a broadband signal and has a bandwidth of 500 MHz.

Each forward link signal is then connected through a switch 628 to an appropriate transmit module 632. Transmit module may include an upconverter (UC) that up-converts the IF forward link signal to a frequency suitable for transmission, followed by a satellite-based transmission amplifier. According to an embodiment of the invention, the satellite-based transmission amplifier may be a traveling wave tube amplifier (TWTA), which efficiently amplifies the signal as a single-carrier signal. Here, each satellite-based transmission amplifier is employed to amplify only one single-carrier signal, which allows the amplifier to be operated more efficiently. This design allows highly efficient use of the satellite-based transmission amplifiers.

Thus, each satellite-based transmission amplifier produces an amplified single-carrier signal that may then be transmitted out using an antenna to form a spot beam that reaches Earth. The spot beam thus has an earth surface coverage area. Subscriber terminals that are within this particular earth surface coverage area would be able to receive the forward link signal. Here, each spot beam is formed by the output of a single satellite-based transmission amplifier. In other words, there is no need to combined the outputs of multiple transmission amplifiers to form each spot beam. This precludes power losses and allows the satellite-based transmission amplifiers to be operated even more efficiently.

The novel use of a single carrier signal per satellite-based transmission amplifier and a single satellite-based transmission amplifier per spot beam aboard a bent pipe repeater optimizes the ratio of data capacity to power consumption at the satellite, to obtain significant improvements in performance from satellite equipment.

Frequency Re-Use for Service and Gateway Beams

According to an embodiment of the invention, a satellite system is presented that adopts multiple levels of frequency re-use to maximize usage of available frequency bandwidth. In addition to employing frequency re-use amongst multiple service beams such that different service beams may occupy a common frequency channel, the system further employs frequency re-use between service beams and feeder beams by locating gateways in regions separated from coverage areas of service beams. In addition, frequency re-use may also be employed amongst multiple feeder beams to allow further gains in spectral efficiency. Such multiple levels of frequency re-use is explained in more detail in an illustrative system as discussed below.

Referring to the example systems depicted in FIGS. 6A and 6B, a star network includes 15 independent feeder beams to support 60 service beams. Thus, each feeder beam corresponds to four service beams. Here, this ratio is maintained in both the uplink and downlink direction. In the forward direction, every uplink feeder beam is relayed by the satellite to generate four downlink service beams. In the return direction, every four uplink service beams are relayed by the satellite to generate one downlink feeder beam. Thus, the star network can be viewed as having 15 groups of signals, each group containing one uplink feeder beam, one downlink feeder beam, four uplink service beams, and four downlink service beams.

FIG. 14 presents an illustrative frequency re-use plan 400 that may be adopted in accordance with one embodiment of the invention. FIG. 14 shows the re-use of frequencies for just 1 of the 15 groups of signals discussed above. However, according to a preferred embodiment of the invention, the same frequency re-use plan 400 can be applied to each of the groups of signals. The particular values shown in FIG. 14, such as the specific frequency channels, are chosen as illustrative examples. Other values may be used within the scope of the present invention.

First, an uplink feeder beam 4002 comprising 4 carriers is shown as being sent from a gateway terminal to the satellite, by utilizing 4 different combinations of frequency and polarization (4 "colors") as described previously. Here, these 4 colors are formed using two different 500 MHz uplink frequency channels, 27.5 GHz-28 GHz and 29.5 GHz-30 GHz, along with two different polarizations, right hand circular polarization (RHCP) and left hand circular polarization (LHCP).

Next, four downlink service beams 4004 are shown as being sent from the satellite to subscriber terminals. There are 4 colors shown, formed using two different 500 MHz downlink frequency channels, 17.7 GHz-18.2 GHz and 19.7 GHz-20.2 GHz, along with two different polarizations RHCP and LHCP. Here, because the four downlink service beams possess spatial diversity amongst themselves, which facilitates frequency re-use, different options exist for how the 4 colors may be used. In one implementation, all four colors are used, each for a different downlink service beam. In another implementation, only two of the colors are used for the four downlink service beams. For example, the two colors representing (1) 17.7 GHz-18.2 GHz with LHCP and (2) 17.7 GHz-18.2 GHz with RHCP may be used to transmit all four downlink service beams. Thus, the downlink service beams may be transmitted using the same 500 MHz bandwidth, but with alternating polarizations (LHCP and RHCP) assigned to physically adjacent downlink service beams, to allow closely spaced beams to be distinguished from one another. Other variations are possible and are within the scope of the present invention.

Next, four uplink service beams 4006 are shown as being sent from subscriber terminals to the satellite. Here, the same 4 colors used to transmit uplink feeder beam 4002 may be re-used to transmit the four uplink service beams 4008. Specifically, these 4 colors are formed using two different 500 MHz uplink frequency channels, 27.5 GHz-28 GHz and 29.5 GHz-30 GHz, along with two different polarizations, RHCP and LHCP. This is possible because the gateway sending uplink feeder beam 4002 is positioned at a different location on Earth than the subscriber terminals sending uplink service beams 4006. Directional antennas on the satellite are therefore able to separately receive uplink feeder beam 4002 and uplink service beam 4008, even though they may be transmitted using the same uplink frequencies and polarizations. In addition, because the four uplink service beams possess spatial diversity amongst themselves, which facilitates frequency re-use, different options exist for how these 4 colors may be used to transmit uplink service beams 4006. For example, all 4 colors may be used, or just 2 colors may be used, or some variation may be adopted. The situation is similar to that discussed above with respect to the four downlink service beams 4004.

Finally, a downlink feeder beam 4008 comprising 4 carriers is shown as being sent from the satellite to the gateway terminal. Here, the same 4 colors used to transmit downlink service beams 4004 may be re-used to transmit the downlink feeder beam 4008. Specifically, these 4 colors are formed using two different 500 MHz downlink frequency channels, 17.7 GHz-18.2 GHz and 19.7 GHz-20.2 GHz, along with two different polarizations RHCP and LHCP. This is possible because the gateway receiving downlink feeder beam 4008 is positioned at a different location on Earth than the subscriber terminals receiving downlink service beams 4004. That is, the gateway is located in the feeder beam coverage area where downlink feeder beam 4008 can be received. Separately, the subscriber terminals are located the service beam coverage areas where downlink service beams 4004 can be received. As such, downlink feeder beam 4008 and downlink service beams 4004 can re-use the same downlink frequencies and polarizations, yet still be separately received by the intended recipients.

As mentioned previously, the same frequency re-use plan 400 may be applied to each of the 15 groups of signals. That is, the entire system comprising 15 uplink feeder beams, 60 downlink service beams, 60 uplink service beams, and 15 downlink feeder beams may simultaneously adopt the same frequency re-use plan 400. This is achieved by capitalizing on spatial diversity that may exist amongst the 60 service beam coverage areas, positioning the 15 feeder beam coverage areas sufficiently far away from the 60 service beam coverage areas, and positioning the 15 feeder beam coverage areas sufficiently far apart from one another. Accordingly, three different levels of frequency re-use are realized. First, frequency re-use is achieved amongst service beams. Second, frequency re-use is achieved between service beams and feeder beams. Third, frequency re-use is achieved amongst feeder beams.

Placement of Gateways Away from Service Beams

According to an embodiment of the invention, a satellite system is presented having efficient placement of gateway terminals. As discussed previously, spatial diversity between gateways and subscriber terminals facilitates frequency re-use of between service beams and feeder beams. Also, spatial diversity amongst gateways facilitates frequency re-use amongst feeder beams. Placement of the gateways may take into account these and other considerations.

In one embodiment, the plurality of different service beam coverage areas (e.g., 60 service beam coverage areas) may be designed to only provide strategically chosen partial coverage over a coverage region. Generally speaking, typical satellite systems that provide communications over a geographic region attempt to achieve full coverage such that service is available over the entire region. However, in accordance with the present embodiment of the invention, a satellite system may be designed to only provide strategically chosen partial coverage over a particular region. For example, the coverage region may comprise a region including the western, eastern, and southern portions of the United States. The specific coverage areas supported by the service beams may be chosen in different ways. For example, the coverage areas may correspond to "underserved" locations, where there may exist significant populations but where high bandwidth network access is not yet readily available.

According to an embodiment of the present invention, the one or more gateways are placed away from the coverage areas of the service beams, to facilitate frequency re-use between service beams and feeder beams. In the example system discussed earlier, suppose the 60 uplink and downlink service beams have coverage areas in a region that spans the western, eastern, and southern portions of the United States. Then the 15 gateways may be located in a region, such as the middle portion of the United States, away from the coverage region of the service beams.

In addition, a plurality of gateways (e.g., 15 gateways) may need to be located sufficiently far apart from each other such that frequency re-use may be further adopted amongst different feeder beams. For instance, each gateway may need to be placed such that has a minimum distance of 400 kilometers from any neighboring gateway. Thus, neighboring gateways may use the same frequency channels without interfering with one another.

A further possible constraint on the placement of the gateways relates to physical proximity to higher bandwidth network access. For example, gateways may be located near optical fiber network connections. This allows the gateways to have fast and robust network access such that data communications requiring access to networks is not hindered. According to one embodiment of the invention, in addition to other requirements, each gateway is placed within a distance of 50 kilometers from an optical fiber network connection.

Yet another possible constraint on the placement of the gateways relates to area weather patterns. Gateways may need to be located in areas that experience minimal rain fade. Just as an example, each gateway may be required to be placed at a location where overall rain fade at the uplink frequency is less 10 dB of fading for 99.99% of the time. This further constrains the selection of possible locations for gateway terminals.

Thus, in accordance with an embodiment of the present invention, the placement of the gateways may take into account multiple factors such as those described above. While meeting such multiple constraints can make the placement of gateways significantly more challenging, a system that adopts these constraints is likely to achieve superior overall performance.

Piggy-Back Satellite Payload

According to one embodiment, a portion of the total bus power aboard a communications satellite is used to support a version of the satellite communication system of the present invention. Referred to as a "piggy back" mode, this technique allows either an entire satellite communication system as described above, or a portion thereof, to be supported by a satellite that also carries other communications payload. For example, if a particular satellite has an available total bus power of 15 kilowatts (KW), and the satellite already has an existing payload that consumes 13 KW of bus power, there may remain 2 KW of excess bus power aboard the satellite. According to one embodiment of the invention, a satellite system as describe above, or a portion thereof, may be implemented by using the remaining 2 KW of bus power. Thus, an example system of 8 service beams and 2 corresponding feeder beams in the forward and return link directions may be deployed using the excess 2 KW of bus power aboard the communication satellite described above.

The added payload may constitute an independent satellite communication system. Alternatively, the added payload may constitute a fraction of a satellite system. For example, a full satellite system may employ 60 service beams and 15 corresponding feeder beams in the forward link and the return link direction, as discussed previously. A fraction of such a system may correspond to the 8 service beams and 2 corresponding feeder beams in the forward and return link directions discussed above. The features of the full satellite system may be substantially represented in the fractional system.

The added payload may adopt a structure similar to that of an independent satellite architecture as described in embodiments discussed previously. For example, in the forward link direction, each feeder beam sent from a gateway to the satellite may comprise 4 signals (represented by four "colors," for instance) that produce 4 separate single-carrier signals sent from the satellite as separate service spot beams to reach subscriber terminals. Other satellite architecture features may similarly be adopted for use in a system implemented as an added payload.

Different implementations are possible. One implementation is briefly described below for illustrative purposes. Here, the added payload comprises a Ka package that can be added to an existing satellite procurement. Such a system may at a very high level enable trade-offs in design that minimize the impact of the package on the physical design and layout, weight, and power on the overall satellite design. An example market for this added payload may be the consumer broadband market. The package may be capable of 10 spot beams each of which is approximately 0.35 degrees Half Power Beam Width (HPBW) on transmit and receive. TWTA redundancy should be consistent with orbital life. The system may have four color re-use with 2 of the 10 spot beams for feeder links. The Effective Isotropic Radiated Power (EIRP) of the package may be 70 dBW per spot beam and the G/T may be 27 dB/° K. per spot beam. The individual transponders may be wide band on the order of 500 MHz. Polarization may be circular and alternate spots may use alternately Left and Right Hand polarization. The input SFD may be settable from −105 to −85 dB in one dB steps.

According to the invention, differently sized payloads may be thus added through use of "piggy back" mode to allow efficient use of excess bus power aboard satellites. Specific parameters such as the number of spot beams implemented may be varied according to the needs of the system.

Adaptive Use of Satellite Uplink Bands

According to an embodiment of the invention, adaptive use of satellite uplink bands is employed. One example implementation of such a technique allows flexible use of frequency channels by a subscriber terminal that is a secondary spectrum license holder. The right of a secondary spectrum license holder to transmit on a specified frequency band is secondary to that of a primary spectrum license holder. That is, the primary spectrum license holder may be able to transmit signals on the frequency band whenever it chooses, without regard for other users. By contrast, a secondary spectrum license holder may only be allowed to transmit on the specified frequency band if the primary spectrum license hold is not transmitting on the specified band. Adaptive use of satellite uplink bands as described in various embodiments of the present invention may be utilized by a subscriber terminal which is a secondary spectrum holder, to ensure that when another signal, e.g., the primary license holder's signal, is detected, re-assignment of the transmit frequency channel can be performed to move satellite uplink transmission to a different frequency as to not interfere with the primary spectrum license holder.

Figure 15:
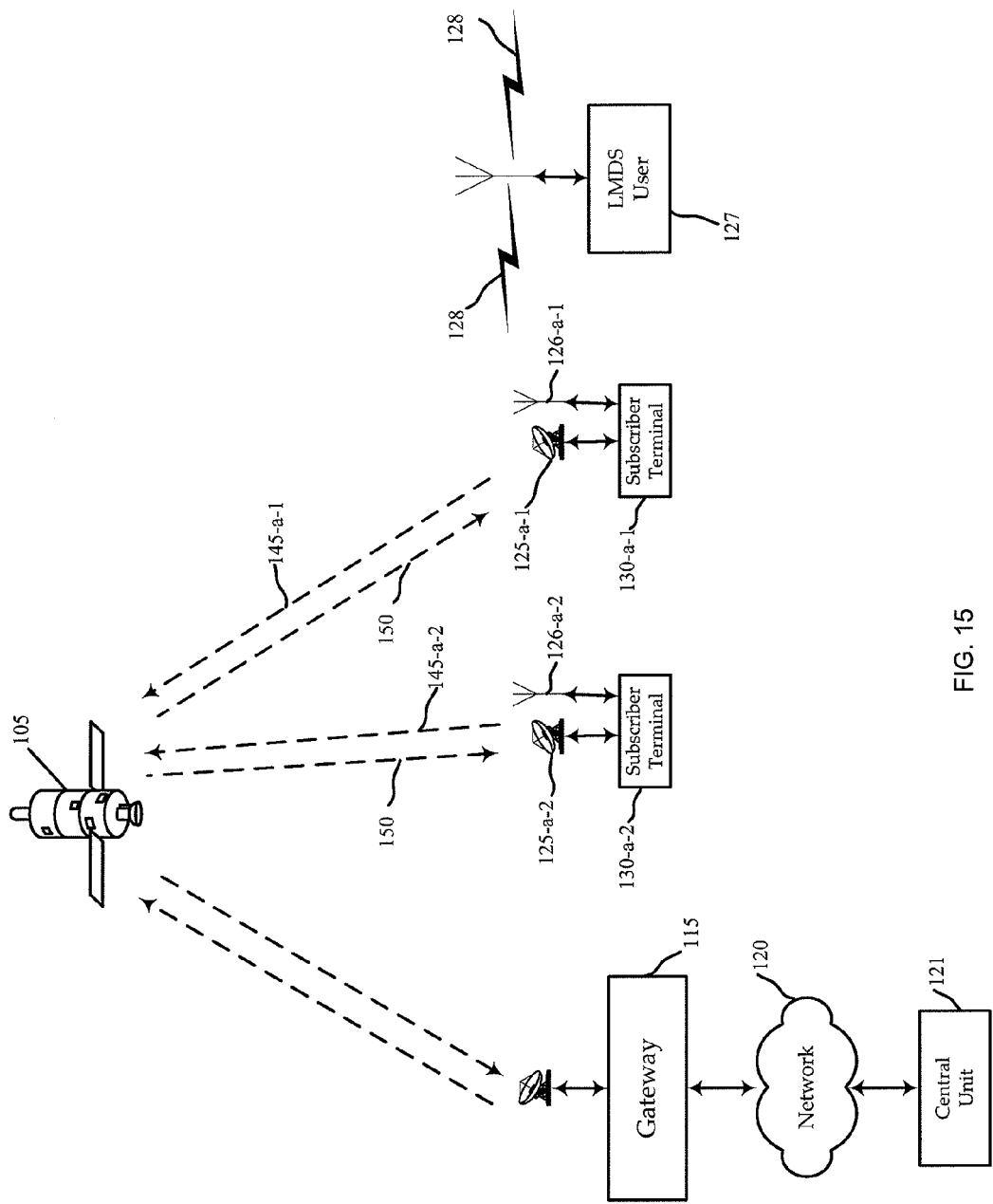
FIG. 15 presents an illustrative system employing adaptive use of satellite uplink bands in accordance with one embodiment of the invention.

FIG. 15 presents an illustrative system employing adaptive use of satellite uplink bands in accordance with one embodiment of the invention. Here, a central unit 121 controls the assignment of transmit frequency channels and receive frequency channels used by subscriber terminals such as 130-a-1 and 130-a-2. Central unit 121 may be coupled to a gateway 115 through network 120. Central unit 121 may thus be connected to other gateways as well, in order to control a larger satellite system. In an alternative embodiment, central unit 121 may be contained in a gateway such as gateway 115.

Central unit 121 assigns to subscriber terminal 130-a-1 a transmit frequency channel in which to transmit satellite uplink signals 145-a-1, as well a receive frequency channel in which to receive satellite downlink signals 150. Similarly, central unit 121 assigns to subscriber terminal 130-a-2 a transmit frequency channel in which to transmit satellite uplink signals 145-a-2, as well as a receive frequency channel in which to receive satellite downlink signals 150. According to an embodiment of the invention, central unit 121 may employ an adoptive scheme to assign transmit frequency channels to one or more subscriber terminals, based on local observations of the transmit frequency spectrum made by the subscriber terminals and reported back to the central unit 121, as discussed below.

Subscriber terminal 130-a-1's transmission of satellite uplink signals 145-a-1 in the assigned transmit frequency channel may be intermittent in nature. For example, the uplink signals may carry web page requests that only require short bursts of data. Thus, the satellite uplink signals may be sent during time-separated periods of transmission. That is, each period of transmission may be limited in duration. The periods of transmission may be separated by time in which no transmission is sent from subscriber terminal 130-a-1.

Subscriber terminal 130-a-1 may monitor the assigned transmit frequency channel between these time-separated periods of transmission of satellite uplink signals. That is, when subscriber terminal 130-a-1 is not transmitting, it can monitor the assigned transmit frequency channel for possible presence of other signals from outside sources. There may be different types of such outside sources, such as a Land Mobile Data Services (LMDS) user 127. One context in which such a scenario could arise is when central unit 121 assigns a transmit frequency channel that utilizes bandwidth in which the LMDS user 127 is the primary spectrum license holder, and subscriber terminal 130-a-1 is a secondary spectrum license holder. As such, subscriber terminal 130-a-1 may not use the assigned transmit frequency channel if the LMDS user 127 is using the channel.

In addition to monitoring the assigned transmit frequency channel, subscriber terminal 130-a-1 may also monitor at least one out-of-band frequency channel different from the assigned transmit frequency channel. For example, subscriber terminal 130-a-1 may also monitor one or more neighboring frequency channels. The neighboring frequency channels may include a number of channels in the vicinity of the assigned transmit frequency channel. These may include channels that are immediately adjacent to the currently assigned transmit frequency channel, as well as other channels. Monitoring of out-of-band frequency channels facilitates detection of other signals, such as signal 128, over a wider range of frequencies. This information allows a more complete picture to be formed regarding the spectrum that can potentially be used by subscriber terminal 130-a-1 for signal transmission.

In one embodiment, subscriber terminal 130-a-1 transmits and receives satellite signals using a first antenna 125-a-1, and performs monitoring of frequency channels using a second antenna 126-a-1. Here, this dual antenna arrangement allows for easier implementation. The first antenna 125-a-1 may be a parabolic reflective antenna pointed toward satellite 150. Thus, the first antenna is suited for transmitting and receiving satellite signals. The second antenna 126-a-2 may be a dipole antenna designed for terrestrial signals. The second antenna may be well suited for detecting terrestrial signals that travel in the direction along the horizon, such as a signal 128 sent from LMDS user 127. This is merely one example arrangement. Variations may be implemented within the scope of the invention.

When a signal such as signal 128 from the LMDS user 127 is detected, subscriber terminal 130-*a*-1 notifies central unit 121. This may be done using an observation result reported back to central unit 121. The observation result may be generated in different ways. As one example, subscriber terminal 130-*a*-1 may generate observation result automatically on a periodic basis. As another example, central unit 121 may request observation results from subscriber terminal 130-*a*-1 at appropriate times. Also, an observation result may be reported in different formats, depending on implementation. The format may a Boolean value, a numeric value, etc. In one implementation, an observation result is sent regardless of whether presence of another signal is detected. In an alternative implementation, an observation result is only sent if presence of another signal is detected.

In response, central unit 121 may re-assign subscriber terminal 130-*a*-1 to a different transmit frequency channel, in order to avoid interfering with the source of the detected signal. In this case, the frequency re-assignment serves to prevent interference with signal 128 sent by LMDS user 127, which may be the primary spectrum license holder. Central unit 121 may determine the new transmit frequency channel for subscriber terminal 130-*a*-1 in different ways. In certain embodiments, the determination is a simple one that does not take into consideration monitoring performed at other subscriber terminals. For example, there may be a default frequency channel that is assigned.

In other embodiments, the determination does take into account monitoring performed at other subscriber terminals. Some or all of the subscriber terminals may perform frequency channel monitoring and report observation results back to central unit 121. Central unit 121 may then decide on an overall frequency assignment that considers the needs of a plurality of subscriber terminals. Thus, the determination of a newly assigned transmit frequency channel for each subscriber terminal may be made as part of the overall frequency assignment. A simple example is described below for illustrative purposes.

Suppose subscriber terminal 130-*a*-1 is currently assigned to transmit satellite uplink signals on frequency channel X and reports that it observes that frequency channel X and most other frequency channels are being used by other signals (such as signal 128 from an LMDS user), and that only one particular frequency channel Y appears to be unused by other signals. Further suppose that subscriber terminal 130-*a*-2 is currently assigned to transmit satellite uplink signals on frequency channel Y and reports that it observes that frequency channel Y and most other frequency channels are not being used by other signals. In response, central unit 121 may determine that the best overall frequency assignment would involve re-assigning subscriber terminal 130-*a*-2 to a transmit frequency channel other than Y, so that channel Y can be assigned to subscriber terminals 130-*a*-1. For instance, subscriber terminal 130-*a*-2 may be re-assigned to frequency channel X, and subscriber terminal 130-*a*-1 may be re-assigned to frequency channel Y. This allows both subscriber terminals to operate without interfering with other signals that may represent primary spectrum license holders, by taking into account the observations made at both subscriber terminals to arrive at a joint frequency plan for the subscriber terminals. Of course, this is only a simple example involving two subscriber terminals. Frequency assignments involving more subscriber terminals are within the scope of the present invention.

It should be noted that the systems, methods, and software discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a structure diagram, or a block diagram. Although they may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other computer readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method for transmitting data in a satellite system having multiple spot beams, the method comprising:
sending a broadband signal in a forward direction from a gateway terminal to a communications satellite for relay to at least one subscriber terminal;
receiving the broadband signal at the communications satellite, wherein the communications satellite comprises a bent pipe repeater having a plurality of satellite-based transmission amplifiers, each satellite-based transmission amplifier configured to perform amplification to generate one and only one service spot beam, wherein there is a one to one correspondence between satellite-based transmission amplifiers and service spot beams;

amplifying the broadband signal using one of the plurality of satellite-based transmission amplifiers to produce an amplified broadband signal, wherein the one of the plurality of satellite-based transmission amplifiers is employed to amplify only the broadband signal and no other broadband signal from the gateway terminal;

sending the amplified broadband signal to the at least one subscriber terminal, the amplified broadband signal being sent as one of a plurality of service spot beams, the one of the plurality of service spot beams having an earth surface coverage area including the at least one subscriber terminal, wherein the amplified broadband signal alone occupies the one of the plurality of service spot beams; and receiving and retrieving data from the amplified broadband signal at the at least one subscriber terminal.

2. The method of claim 1 wherein the amplified broadband signal is a single-carrier signal.

3. The method of claim 2 wherein the amplified broadband signal supports a data rate of at least 1 Gigabits per second (Gbps).

4. The method of claim 2 wherein the amplified broadband signal has a bandwidth of at least 500 MHz.

5. The method of claim 1 wherein each of the plurality of satellite-based transmission amplifiers comprises a traveling wave tube amplifier (TWTA).

6. The method of claim 1 wherein the plurality of service spot beams comprise 60 service spot beams.

7. The method of claim 1 wherein the broadband signal sent from the gateway terminal to the communications satellite is contained in one of a plurality of feeder beams sent from gateway terminals to the communications satellite.

8. The method of claim 7 wherein the plurality of feeder beams comprises 15 feeder beams.

9. The method of claim 7 wherein each of the plurality of feeder beams contains 4 carriers each representing a separate signal sent in the forward direction from a gateway terminal to the communications satellite.

10. The method of claim 1 wherein sending the amplified broadband signal comprises sending the amplified broadband signal using one of a plurality of antennas of the communications satellite, and the number of satellite-based transmission amplifiers in the plurality of satellite-based transmission amplifiers equals the number of antennas in the plurality of antennas.

11. The method of claim 1 wherein at least the one of the plurality of satellite-based transmission amplifiers is operated at full saturation.

12. An apparatus for transmitting data in a satellite system having multiple spot beams comprising:

at least one subscriber terminal;

a gateway terminal configured to send a broadband signal in a forward direction to a communications satellite for relay to the at least one subscriber terminal;

wherein the communications satellite is configured to receive the broadband signal, the communications satellite comprising a bent pipe repeater having a plurality of satellite-based transmission amplifiers, each satellite-based transmission amplifier configured to perform amplification to generate one and only one service spot beam, wherein there is a one to one correspondence between satellite-based transmission amplifiers and service spot beams;

wherein one of the plurality of satellite-based transmission amplifiers is configured to amplify only the broadband signal and no other broadband signal from the gateway terminal, to produce an amplified broadband signal;

wherein the amplified broadband signal is suited for transmission to the at least one subscriber terminal as one of a plurality of service spot beams, the one of the plurality of service spot beams having an earth surface coverage area including the at least one subscriber terminal, wherein the amplified broadband signal alone occupies the one of the plurality of service spot beams; and wherein the at least one subscriber terminal is configured to receive and retrieve data from the amplified broadband signal.

13. The apparatus of claim 12 wherein the amplified broadband signal is a single-carrier signal.

14. The apparatus of claim 13 wherein the amplified broadband signal supports a data rate of at least 1 Gigabits per second (Gbps).

15. The apparatus of claim 13 wherein the amplified broadband signal has a bandwidth of at least 500 MHz.

16. The apparatus of claim 12 wherein each of the plurality of satellite-based transmission amplifiers comprises a traveling wave tube amplifier (TWTA).

17. The apparatus of claim 12 wherein the plurality of service spot beams comprise 60 service spot beams.

18. The apparatus of claim 12 wherein the broadband signal to be sent from the gateway terminal to the communications satellite is contained in one of a plurality of feeder beams sent from gateway terminals to the communications satellite.

19. The apparatus of claim 18 wherein the plurality of feeder beams comprises 15 feeder beams.

20. The apparatus of claim 18 wherein each of the plurality of feeder beams contains 4 carriers each representing a separate signal sent in the forward direction from a gateway terminal to the communications satellite.

21. The apparatus of claim 12 wherein the communications satellite further comprises a plurality of antennas, each antenna configured to send an amplified broadband signal to at least one subscriber terminal, and the number of satellite-based transmission amplifiers in the plurality of satellite-based transmission amplifiers equals the number of antennas in the plurality of antennas.

22. The apparatus of claim 12 wherein at least the one of the plurality of satellite-based transmission amplifiers is configured to operate at full saturation.

23. A system for transmitting data in a satellite system having multiple spot beams, the system comprising:

means for sending a broadband signal in a forward direction from a gateway terminal to a communications satellite for relay to at least one subscriber terminal;

means for receiving the broadband signal at the communications satellite, wherein the communications satellite comprises a bent pipe repeater having a plurality of satellite-based transmission amplifiers, each satellite-based transmission amplifier configured to perform amplification to generate one and only one service spot beam, wherein there is a one to one correspondence between satellite-based transmission amplifiers and service spot beams;

means for amplifying the broadband signal using one of the plurality of satellite-based transmission amplifiers to produce an amplified broadband signal, wherein the one of the plurality of satellite-based transmission amplifiers is employed to amplify only the broadband signal and no other broadband signal from the gateway terminal;

means for sending the amplified broadband signal to the at least one subscriber terminal, the amplified broadband signal being sent as one of a plurality of service spot beams, the one of the plurality of service spot beams having an earth surface coverage area including the at least one subscriber terminal, wherein the amplified broadband signal alone occupies the one of the plurality of service spot beams; and means for receiving and retrieving data from the amplified broadband signal at the at least one subscriber terminal.

24. The system of claim 23 wherein the means for sending the amplified broadband signal use one of a plurality of antennas of the communications satellite, and the number of satellite-based transmission amplifiers in the plurality of satellite-based transmission amplifiers equals the number of antennas in the plurality of antennas.

25. The system of claim 23 wherein at least the one of the plurality of satellite-based transmission amplifiers is operated at full saturation.

* * * * *